United States Patent
Ucar et al.

(10) Patent No.: US 11,962,472 B2
(45) Date of Patent: Apr. 16, 2024

(54) SYSTEMS AND METHODS TO FORM REMOTE VEHICULAR MICRO CLOUDS

(71) Applicant: TOYOTA MOTOR ENGINEERING & MANUFACTURING NORTH AMERICA, INC., Plano, TX (US)

(72) Inventors: Seyhan Ucar, Mountain View, CA (US); Takamasa Higuchi, Mountain View, CA (US); Onur Altintas, Mountain View, CA (US); Kentaro Oguchi, Mountain View, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/945,495

(22) Filed: Sep. 15, 2022

(65) Prior Publication Data
US 2024/0097984 A1    Mar. 21, 2024

(51) Int. Cl.
G08G 1/01   (2006.01)
H04L 41/12  (2022.01)
H04L 67/10  (2022.01)

(52) U.S. Cl.
CPC ............ *H04L 41/12* (2013.01); *G08G 1/0112* (2013.01); *H04L 67/10* (2013.01)

(58) Field of Classification Search
CPC ........ H04L 41/12; H04L 67/10; G08G 1/0112
See application file for complete search history.

(56) References Cited

U.S. PATENT DOCUMENTS

| 9,146,603 B2 * | 9/2015 | Reber ..................... H04L 67/12 |
| 10,146,410 B2 | 12/2018 | Haupt |

(Continued)

FOREIGN PATENT DOCUMENTS

| EP | 2494472 | 9/2012 |
| WO | WO-2022136734 A1 * | 6/2022 .......... B60W 60/001 |

OTHER PUBLICATIONS

Altintas et al., "Making Cars a Main ICT Resource in Smart Cities," 34th IEEE Conference on Computer Communications (INFOCOM 2015), International Workshop on Smart Cities and Urban Informatics (SmartCities 2015), 2015:654-659 (https://doi.org/10.1109/INFCOMW.2015.7179448).

(Continued)

*Primary Examiner* — Cheikh T Ndiaye
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods are provided for forming remote vehicular micro clouds at one or more remote locations. According to some embodiments, the methods and systems comprise responsive to receiving a request to form a vehicular micro cloud from a client device, communicating with a plurality of vehicles within an area of a geographic location to collectively form a vehicular micro cloud at the geographic location, where client device is remote from the area of the geographic location. The methods and systems further include receiving resource data from the plurality of vehicles, the resource data comprising detection results of an environment surrounding the geographic location based on sensor sets of the plurality of vehicles, and transmitting the resource data to the client device.

18 Claims, 11 Drawing Sheets

(56) References Cited

U.S. PATENT DOCUMENTS

| | | | | |
|---|---|---|---|---|
| 2013/0304863 A1* | 11/2013 | Reber | ............... | H04L 67/10 |
| | | | | 709/218 |
| 2015/0362899 A1* | 12/2015 | Reber | ............... | G06Q 30/04 |
| | | | | 700/98 |
| 2018/0241810 A1* | 8/2018 | Lerzer | ............... | H04L 67/10 |
| 2021/0306682 A1 | 9/2021 | Ucar | | |
| 2021/0343091 A1* | 11/2021 | Clément | ......... | G08G 1/0145 |

OTHER PUBLICATIONS

Hagenauer et al., "Vehicular Micro Clouds as Virtual Edge Servers for Efficient Data Collection," CarSys '17: Proceedings of the 2nd ACM International Workshop on Smart, Autonomous, and Connected Vehicular Systems and Services, Oct. 20, 2017, pp. 31-35 (https://www.ccs-labs.org/bib/hagenauer2017vehicular/hagenauer2017vehicular.pdf).

Hagenauer et al., "Parked Cars as Virtual Network Infrastructure: Enabling Stable V2I Access for Long-Lasting Data Flows," CarSys '17: Proceedings of the 2nd ACM International Workshop on Smart, Autonomous, and Connected Vehicular Systems and Services, Oct. 20, 2017, pp. 57-64 (https://www.cms-labs.org/bib/hagenauer2017parked/hagenauer2017parked.pdf).

Kozat et al., "Service Discovery in Mobile Ad Hoc Networks: An Overall Perspective on Architectural Choices and Network Layer Support Issues," Ad Hoc Networks, 2(1):23-44, Jan. 2004 (https://citeseerx.ist.psu.edu/viewdoc/download?doi=10.1.1.404.4282&rep=rep1&type=pdf).

Higuchi et al., "On the Feasibility of Vehicular Micro Clouds," 2017 IEEE Vehicular Networking Conference (VNC), pp. 179-182, Nov. 2017 (https://doi.org/10.1109/VNC.2017.8275621).

Hagenauer et al., "Vehicular Micro Cloud in Action: On Gateway Selection and Gateway Handovers," Ad Hoc Networks, 78(C):73-83, Sep. 2018 (https://www.ccs-labs.org/bib/hagenauer2018vehicular/hagenauer2018vehicular.pdf).

Khayyat et al., "Multilevel Service-Provisioning-Based Autonomous Vehicle Applications," Sustainability, 12(6):2497-2513, Mar. 2020 (https://doi.org/10.3390/su12062497).

Zhang et al., "Remote Control System of Smart Appliances Based on Wireless Sensor Network," 2013 25th Chinese Control and Decision Conference (CCDC), pp. 3704-3709, May 2013 (https://doi.org/10.1109/CCDC.2013.6561592).

Dikaiakos et al., "Location-Aware Services over Vehicular Ad-Hoc Networks using Car-to-Car Communication," IEEE Journal on Selected Areas in Communications, Oct. 15, 2007, 25(8):1590-1602 (https://citeseerx.ist.psu.edu/viewdoc/download?doi=10.1.1.62.5919&rep=rep1&type=pdf).

* cited by examiner

SYSTEMS AND METHODS TO FORM REMOTE VEHICULAR MICRO CLOUDS

TECHNICAL FIELD

The present disclosure relates generally to systems and methods for forming vehicular micro clouds, and more particularly, some implementations may relate to forming vehicular micro clouds at one or more remote locations.

DESCRIPTION OF RELATED ART

Two or more vehicles can establish communications connections (e.g., via vehicle-to-everything communication protocol, referred to as V2X) to form a group of interconnected vehicles that are located within a common geographic vicinity. Such groups are known as "vehicular micro clouds." The first vehicle or roadside unit/equipment triggering formation of a vehicular micro cloud may be referred to as a micro cloud leader and connected members in the vehicular micro cloud (referred to herein as "micro cloud members") can have varying types of equipment, computing resources and capabilities, for example, depending on the model/make of the vehicle. Micro cloud members in a vehicular micro cloud can share their capabilities and computing resources with other members of the vehicular micro cloud to collaborate on operational tasks, such as, for example, environmental sensing, data processing, and data storage.

BRIEF SUMMARY OF THE DISCLOSURE

According to various embodiments of the disclosed technology, systems and methods for forming remote vehicular micro clouds at one or more remote locations is provided.

In accordance with some embodiments, a method for remote vehicular micro cloud formation is provided. The methods comprises responsive to receiving a request to form a vehicular micro cloud from a client device, communicating with a plurality of vehicles within an area of a geographic location to collectively form a vehicular micro cloud at the geographic location. The client device is remote from the area of the geographic location. The method further comprises receiving resource data from the plurality of vehicles, the resource data comprising detection results of an environment surrounding the geographic location based on sensor sets of the plurality of vehicles, and transmitting the resource data to the client device.

In another aspect, a system for remote vehicular cloud formation is provided that comprises a communication circuit configured to exchange communications between the system and members of a vehicular micro cloud, a memory storing instructions; and one or more processors communicably coupled to the memory. The one or more processors are configured to, responsive to receiving a request to form a vehicular micro cloud from a client device, communicate with a plurality of vehicles within an area of a geographic location to collectively form a vehicular micro cloud at the geographic location. The client device is remote from the area of the geographic location. The one or more processors are further configured to execute the instructions to receive resource data from the plurality of vehicles, the resource data comprising detection results of an environment surrounding the geographic location based on sensor sets of the plurality of vehicles, and transmit the resource data to the client device.

In another aspect, a non-transitory machine-readable medium is provided. The non-transitory computer-readable medium includes instructions that when executed by a processor cause the processor to perform operations including receiving a request to form a remote vehicular micro cloud from a client device, the request comprising a target geographic region that is geographically remote from the client device and information defining a task to be executed by the remote vehicular micro cloud. The operations further include, in response to receiving the request, selecting one or more geographic locations withing the target geographic region, establishing one or more remote vehicular micro clouds at the one or more geographic locations by communicating with at least one of one or more roadside equipment and one or more vehicles within a defined area from each of the one or more geographic locations, generating a detection result related to the task included in the request based on resource data received from the at least one of one or more roadside equipment and one or more vehicles, and transmit the detection results to the client device Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
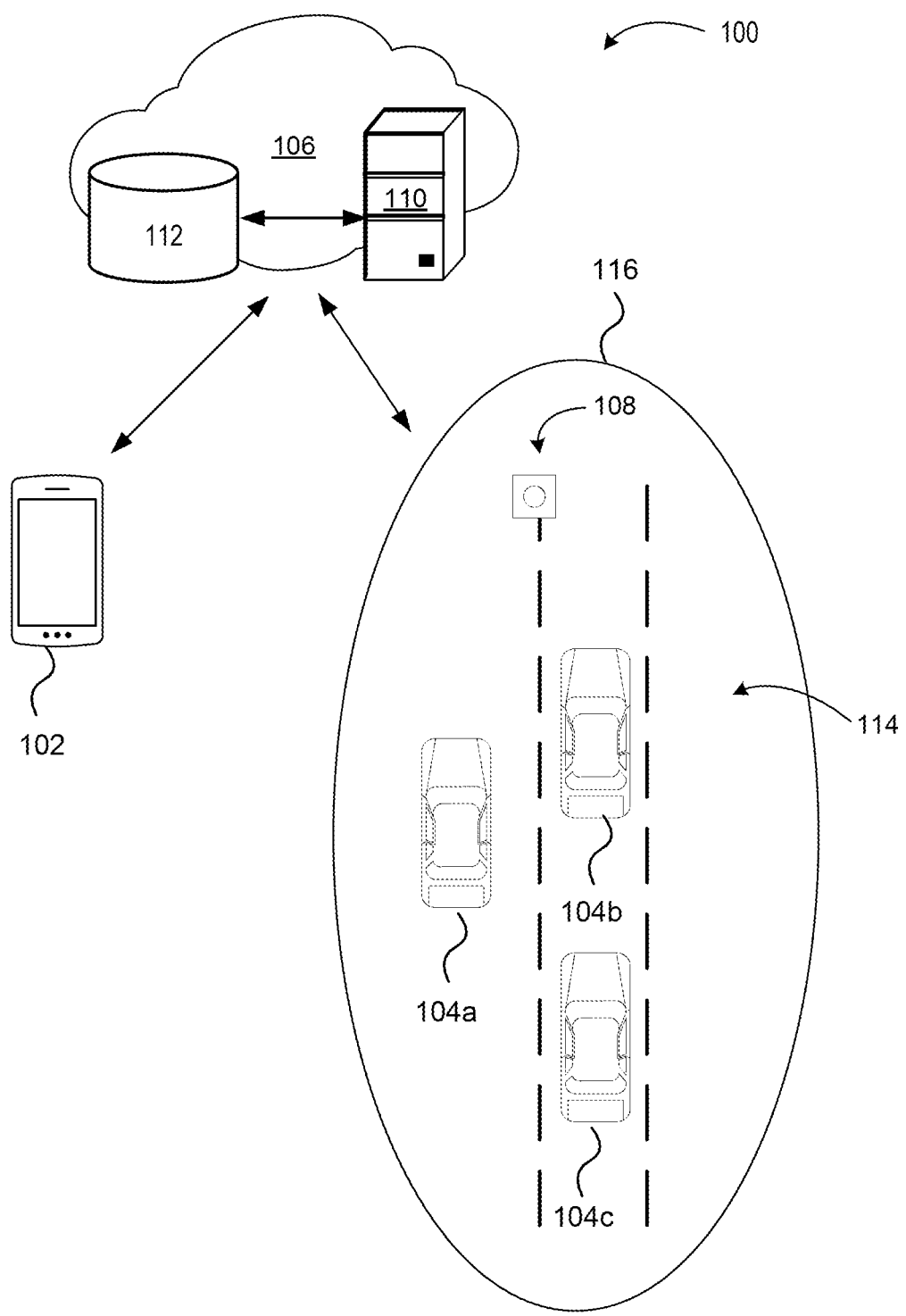
FIG. 1 is a schematic diagram of an example operating environment for remote vehicular micro cloud formation in accordance with various embodiments disclosed herein.

The figures are not exhaustive and do not limit the present disclosure to the precise form disclosed.

DETAILED DESCRIPTION

Embodiments of the systems and methods disclosed herein can provide formation of a vehicular micro cloud for collaboration on an operational task, where the vehicular micro cloud is geographically remote relative to an entity seeking to reap the benefits of the operational task. For example, embodiments of the present disclosure may receive a request to complete an operational task from a client device operated by a user and, responsive to the request, establish communication with a plurality of vehicles and/or roadside equipment/units (RSE/RSU) to form a vehicular micro cloud within a geographic area that is geographically remote from the requesting client device. Resource data can be collected based on capabilities and computing resources of the vehicles and/or RSE/RSUs to collaborate on the operational task, with the results thereof being provided to the remote user via the client device.

Conventionally, vehicular micro cloud formation generally involves connected vehicles that are close by one another forming a micro cloud, where the connected vehicles are referred to as "micro cloud members." In conventional systems, a micro cloud leader establishes a vehicular micro cloud for a geographic area in which the micro cloud leader is located and connected vehicles collaboratively perform computation, data storage, sensing, communication tasks and any combination thereof among the micro cloud members over Vehicle-to-Everything (V2X) networks, such as V2V networks. Results of the collaboration are shared by the micro cloud leader. Example operational tasks include, but are not limited to: (1) collaboratively performing resource-intensive computational tasks among the micro cloud members; (2) collaboratively keeping and updating data content among the micro cloud members; (3) collaboratively performing sensing of road conditions by on-board sensors of the micro cloud members; and (4) collaboratively downloading or uploading data content from or to a cloud server (or an edge server).

Using vehicular micro clouds removes the need for the connected vehicles to access remote cloud servers or edge servers by leveraging vehicle-to-network (V2N) communications (e.g., by cellular networks) whenever the connected vehicles need access to data (e.g., high-definition road map for automated driving). Depending on a mobility of the vehicular micro clouds, the vehicular micro clouds can be categorized into two types by way of examples: a stationary vehicular micro cloud and a mobile vehicular micro cloud.

A stationary vehicular micro cloud can be tied to a certain geographic location (e.g., an intersection, address, etc.). A micro cloud leader (e.g., a connected RSU and/or member vehicle which acts as a leader in the vehicular micro cloud) establishes or forms the stationary vehicular micro cloud for a geographic location by forming the micro cloud for a defined area surrounding the micro cloud leader. In the case of a member vehicle acting as micro cloud leader, the designation of micro cloud leader can be handed over between member vehicles as vehicles exit and enter the defined geographic area. A vehicle joins a stationary vehicular micro cloud when entering the defined geographic area of the stationary vehicular micro cloud and leaves the stationary vehicular micro cloud when exiting from the defined geographic area. When exiting from the defined geographic area, the vehicle also hands over on-going tasks and data of the stationary vehicular micro cloud to other micro cloud members. In some embodiments, parked vehicles can also be micro cloud members of the stationary vehicular micro cloud.

In a mobile vehicular micro cloud, a connected vehicle acts as micro cloud leader and can invite nearby vehicles to join the mobile vehicular micro cloud. Unlike the stationary vehicular micro cloud, the mobile vehicular micro cloud moves with the micro cloud leader as the micro cloud leader travels. The micro cloud leader recruits other micro cloud members to join the mobile vehicular micro cloud and distributes sub-tasks to the other micro cloud members for collaborative task execution, similar to vehicles joining a stationary vehicular micro cloud. The micro cloud leader also dismisses micro cloud members that exit the mobile vehicular micro cloud, either due to movement of the micro cloud leader and/or movement of the dismissed micro cloud members. As with the stationary vehicular micro cloud, when exiting from vehicular micro cloud, the dismissed vehicle may hand over on-going tasks and data of the vehicular micro cloud to micro cloud members, including the micro cloud leader.

However, existing vehicular micro clouds are formed only at geographic areas in which the micro cloud leader is also located (sometimes referred to herein as "local communication based formation"), which is overly limiting. A micro cloud leader initiates formation of the vehicular micro cloud and communicates with other vehicles and devices within a defined geographic area surrounding the micro cloud leader (e.g., within a nearby vicinity) to collaborate on a task. For example, a connected vehicle may want to know conditions of a road section in which the connected vehicle is traveling. To achieve this task, the connected vehicle triggers formation of a vehicular micro cloud (e.g., becoming the micro cloud leader), announces formation of the vehicular micro cloud via local communication (e.g., V2V communication), vehicles in the nearby vicinity receive the announcement and connect to the micro cloud leader, thereby becoming micro cloud members. The micro cloud members collaboratively monitor the road conditions within the geographic area surrounding the micro cloud leader, which is provided to the micro cloud leader via local communication. However, such forming strategies limit the benefits of vehicular micro clouds, because micro cloud leaders must physically be within a range of other vehicles to initiate the vehicular micro cloud formation and lead the collaboration. However, in many situations, there may not be a need to initiate micro cloud formation from devices coexisting within a common area, instead remote triggering and formation of a vehicular micro cloud can be useful even though there may not be a local task achieved by in forming a micro cloud in that particular instance. That is, the operational task pertaining to a vehicle or device located at the location at which the vehicular micro cloud is formed. Thus, existing solutions are not adequate because they do not consider the benefits of vehicular micro clouds formed on-demand at geographic locations remote from the micro cloud leader. These existing solutions do not permit formation of vehicular micro clouds from a micro cloud leader that is located remote from the formed micro cloud at a separate geographic location, as well as other features that are described below.

For example, a remote user may wish to locate an unconnected vehicle operated by another user (e.g., a relative, spouse, etc.) within a geographic region, such as an urban area (e.g., city, town, village, etc.). The remote user may wish to connect with connected vehicles in the proximate vicinity of the unconnected vehicle to collaborate on the task of locating and providing a location of the unconnected vehicle (e.g., a cross street or intersection within the city area). Accordingly, embodiments disclosed herein provide for triggering formation of a vehicular micro cloud at a geographic location that is separate from the remote user upon receipt of a request to form a vehicular micro cloud. A client device of the remote user may request formation of a vehicular micro cloud to execute a task within a designated geographic region (also referred to herein as a target geographic region), which triggers formation of the vehicular micro cloud at a geographic location within the target geographic region and sets the client device as the micro cloud leader. Formation of the vehicular micro cloud may be achieved by establishing communications between a cloud server (or edge server) and a plurality of connected vehicles within a defined area of the geographic location. Connected vehicles and/or RSU/RSEs within the defined area can be joined the vehicular micro cloud and share detection results from capabilities and/or computing resources to collaborate on the task of locating the unconnected vehicle. For example, micro cloud members may user sensors capture image frames and/or video feeds of the environment surrounding the geographic location. The respective image frames and/or video feeds can be collected and stitched together according to respective positions of the connected vehicles and/or RSE/RSUs to detect the unconnected vehicle. Using positions and/or image processing techniques on the stitched images, a location of the unconnected vehicle can be determined and communicated to the client device of the remote user.

As another example, a remote user may wish to know the availability of parking within a geographic region, such as, but not limited to, parking lots, parking structures, street parking, etc. (collectively referred to as a parking area). The remote user may wish to connect with connected vehicles in the proximate vicinity of the parking area to collaborate on a task of measuring parking availability. Accordingly, similar to the preceding example, embodiments disclosed herein provide for formation of a vehicular micro cloud at the geographic region of the parking area, separate from the remote user, and collaborating with connected vehicles and/or edge devices within the geographic region to measure parking availability. For example, micro cloud members may share images of the environment surrounding the parking area captured by respective image systems, which can be stitched together and used to measure the parking availability.

In some embodiments, the vehicular micro cloud may be a stationary vehicular micro cloud at the geographic location, for example, at an intersection within the designated geographic region. In some embodiments, the vehicular micro cloud may be a mobile vehicular micro cloud, for example, a connected vehicle can be designated as a proxy micro cloud leader for the purpose of moving the mobile vehicular micro cloud with the proxy micro cloud leader. In some embodiments, one or more vehicular micro clouds may be formed at one or more geographic locations within the designated geographic region, which may include one or more stationary vehicular micro clouds, one or more mobile vehicular micro clouds, and/or a combination thereof.

Accordingly, different from the existing solutions, the vehicular micro cloud formation system and the micro cloud leader client described herein cooperate with one another to provide on-demand formation of vehicular micro clouds at one or more geographic locations physically remote and separate from a location in which the micro cloud leader client is located. The vehicular cloud formation system and the micro cloud leader client are described below in more detail.

As described herein, examples of V2X communications include, but are not limited to, one or more of the following: Dedicated Short Range Communication (DSRC) (including Basic Safety Messages (BSMs) and Personal Safety Messages (PSMs), among other types of DSRC communication); Long-Term Evolution (LTE); millimeter wave (mmWave) communication; 3G; 4G; 5G; LTE-V2X; 5G-V2X; LTE-Vehicle-to-Vehicle (LTE-V2V); LTE-Device-to-Device (LTE-D2D); Voice over LTE (VoLTE); etc. In some examples, the V2X communications can include V2V communications, Vehicle-to-Infrastructure (V2I) communications, Vehicle-to-Network (V2N) communications or any combination thereof.

Examples of a wireless message (e.g., a V2X wireless message) described herein include, but are not limited to, the following messages: a Dedicated Short Range Communication (DSRC) message; a Basic Safety Message (BSM); a Long-Term Evolution (LTE) message; an LTE-V2X message (e.g., an LTE-Vehicle-to-Vehicle (LTE-V2V) message, an LTE-Vehicle-to-Infrastructure (LTE-V2I) message, an LTE-V2N message, etc.); a 5G-V2X message; and a millimeter wave message, etc.

FIG. 1 is a schematic diagram of an example operating environment 100 for remote vehicular micro cloud formation in accordance with various embodiments disclosed herein. The environment includes at least one client device 102, one or more vehicles 104a-104b, one or more roadside units or other infrastructure devices 108 and a cloud or edge server 110. The one or more vehicles 104 may each provide similar functionality and are referred to herein "vehicle 104" individually or collectively. The one or more roadside units or other infrastructure devices 108 may provide similar functionality and are referred to herein as "RSU 108" individually or collectively. These elements of the system 100 may be communicatively coupled to network 106. The cloud or edge server 110 receives a request to form a vehicular micro cloud from the client device 102 and establishes vehicular micro cloud 114 in an area 114 at a location remote from the client device 110.

The client device 102 may be any device operated by a user configured for wireless communication via network 106. The client device 102 may be, for example but not limited to, a smartphone, a desktop computer, a laptop computer, a tablet computer, a netbook computer, a television or similar monitor, a content receiver, a set-top box, a personal digital assistant (PDA), a wearable smart device such as smartwatches and the like, a mobile phone, a smart phone, a smart terminal, a dumb terminal, a virtual terminal, a video game console, and the like. In some embodiments, the client device 102 may be a vehicle operated by the user, for example, a vehicle having similar capabilities to that of vehicles 104 and connected to network 106 via V2X communication.

Server 110 may be an edge server or a cloud server. For example, server 110 may be an edge server implemented as a processor-based computing device installed in a roadside unit/roadside equipment ("RSU") or some other processor-based infrastructure component of a roadway. While a cloud server may be one or more cloud-based instances of processor-based computing device residents on network 106. Server 110 may include circuitry to control various aspects of the remote vehicular micro cloud formation described herein. Server 110 may include, for example, a microcomputer that includes a one or more processing units (e.g., microprocessors), memory storage (e.g., RAM, ROM, etc.), and I/O devices. The server 110 may store information related to formation of vehicular micro cloud in a cloud-based database 112, which may be resident on network 106. The processing units of cloud server 110, execute instructions stored in memory to execute and control functions of the vehicular micro cloud system, for example, as described below in connection with FIGS. 4-9B.

Network 106 may be a conventional type of network, wired or wireless, and may have numerous different configurations including a star configuration, token ring configuration, or other configurations. Furthermore, the network 106 may include a local area network (LAN), a wide area network (WAN) (e.g., the Internet), or other interconnected data paths across which multiple devices and/or entities may communicate. In some embodiments, the network 106 may include a peer-to-peer network. The network 106 may also be coupled to or may include portions of a telecommunications network for sending data in a variety of different communication protocols. In some embodiments, the network 106 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, Wi-Fi (infrastructure mode), Wi-Fi (ad-hoc mode), visible light communication, TV white space communication and satellite communication. The network 106 may also include a mobile data network that may include 3G, 4G, 5G, LTE, LTE-V2V, LTE-V2I, LTE-V2X, LTE-D2D, VoLTE, 5G-V2X or any other mobile data network or combination of mobile data networks. Further, the network 105 may include one or more IEEE 802.11 wireless networks.

In some embodiments, the network 106 includes a V2X network (e.g., a V2X wireless network). The V2X network is a communication network that enables entities such as elements of the operating environment to wirelessly communicate with one another via one or more of the following: Wi-Fi; cellular communication including 3G, 4G, LTE, 5G, etc.; Dedicated Short Range Communication (DSRC); millimeter wave communication; etc.

Vehicles 104 may be any type of vehicle. Vehicles 104 may be, for example but not limited to, a car; a truck; a sports utility vehicle; a bus; a semi-truck; a drone or any other roadway-based conveyance. In some embodiments, vehicle 104 includes a communication circuitry such that the vehicle is able to be a "connected vehicle," where the communication circuitry includes any hardware and software that is needed to enable the vehicle 104 to communicate with other entities via the network 106.

For example, vehicles 104 may have V2X communication capabilities, allowing vehicles 104 to communicate with edge devices, roadside infrastructure (e.g., such as RSU 108, which may be a vehicle-to-infrastructure (V2I)-enabled street light or cameras, for example). Vehicle 104 may also communicate with other vehicles 104 over vehicle-to-vehicle (V2V) communications. It should be understood that sometimes, a vehicle itself may act as a network node or edge computing device. For example, vehicle 104a may be a network edge device. The data gathered by vehicles 104, either through their own sensors, or other data sources, e.g., RSU 108 and other vehicles, may be ultimately be transmitted to the cloud, e.g., the cloud server 110 and cloud-based database 112 resident on network 106.

As used herein, "connected vehicle" refers to a vehicle that is actively connected to edge devices, other vehicles, and/or a cloud server via a network through V2X, V2I, and/or V2V communications. An "unconnected vehicle" refers to a vehicle that is not actively connected. That is, for example, an unconnected vehicle may include communication circuitry capable of wireless communication (e.g., V2X, V2I, V2V, etc.), but for whatever reason is not actively connected to other vehicles and/or communication devices. For example, the capabilities may be disabled, unresponsive due to low signal quality, etc. Further, an unconnected vehicle, in some embodiments, may be incapable of such communication, for example, in a case where the vehicle does not have the hardware/software providing such capabilities installed therein.

Vehicles 104 comprise a sensor set formed of one or more sensors, e.g., vehicle operating condition sensor, external sensors, in-cabin sensors, and the like. For example, vehicles 104 may have proximity and/or image sensors that can detect nearby objects and/or other vehicles, gather data pertaining to the nearby objects and/or other vehicles, etc. Vehicles 104 may also have position sensors, such as a global positioning system (GPS) or other vehicle positioning system. Vehicles 104 may be DSRC-equipped vehicles. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by an Advanced Driver Assistance System (ADAS) of a modern vehicle require positioning information that describes the geographic position of the vehicle with lane-level accuracy. In addition, the current standard for DSRC requires that the geographic position of the vehicle be described with lane-level accuracy.

As used herein, the words "geographic location," "location," "geographic position" and "position" refer to a latitude and longitude of an object (or, a latitude, longitude, and elevation of an object), such as a connected vehicle, an RSU/RSE, a client device, etc. As used herein, the words "geographic area", and "area," refer to a physical space surrounding a geographic location (e.g., an area of defined space surrounding a geographic location or position). The example embodiments described herein may provide positioning information that describes a geographic position of a vehicle with an accuracy of one or more of: (1) at least plus or minus 1.5 meters in relation to the actual geographic position of the vehicle in two dimensions including a latitude and a longitude; and (2) at least plus or minus 3 meters in relation to the actual geographic position of the vehicle in an elevation dimension. Accordingly, the example embodiments described herein are able to describe the geographic position of the vehicle with lane-level accuracy or better.

According to embodiments disclosed herein, the client device 102, seeking collaborative execution of an operational task, sends a request to form vehicular micro cloud 114 to server 110. The request includes formation rules identifying a target geographic region and/or location and information defining the task to be executed in the vehicular micro cloud. The server 110 selects a geographic location within the target geographic region and triggers formation of at least one vehicular micro cloud 114 at the geographic location. The at least one vehicular micro cloud 114 encompasses a defined physical area 116 surrounding the geographic location. The area may be pre-defined by the server 110 and/or defined by the client device 102 as part of the request. The cloud server 110 sets the client device 102 as the micro cloud leader. The cloud server 110 adds any RSU/RSE (e.g., RSU 108 in this example) as micro cloud members and detects connected vehicles 104 that are within or pass through the area 116, which are also added as micro cloud members. Vehicles 104 may be detected based on GPS coordinates communicated to server 110. In some embodiments, micro cloud member capabilities may be leveraged by the server 110 to detect vehicles 104 within the area 116 (e.g., via an image sensor or other sensor of the sensor set). The micro cloud members can then share resources and capabilities to collaborate on the task, included in the request, by transmitting resource data to the server 110. For example, micro cloud members may share resource data including, but not limited to, image frames and/or video feeds from image sensors, image processing results from image frames and/or video frames, object detection results from proximity sensors, GPS coordinates, computation results from subsystems processing data received from sensor sets. Resource data can be aggregated together to provide collaborative results relevant to the requested task. In some embodiments, aggregation of the sensor data may be performed at the server 110, while in other embodiments aggregation may be performed at the client device 102.

In some implementations, the cloud server 110 may not be mandatory. For example, in some cases, V2X or cellular communication may not be available in target location. In such a case, the request from the client device 102 can be sent in a multi-hop manner and results from micro cloud members 104 are retrieved back in the same manner.

As alluded to above, the request from the client device 102 includes formation rules. Formation rules may include identification of a target geographic region of the requested vehicular micro cloud. For example, the request may include a target geographic region provided as, for example but not limited to, an address, designation of an urban area (e.g., a city, town, village, downtown of a city, a block of a city, etc.), a street of interest, intersection of roadways, a landmark or structure, parking area, roadway ahead of the client device, etc. Formation rules may also include an information defining the task to be executed in the vehicular micro cloud. For example, the request may include identification of an object (e.g., a target person, vehicle, landmark, etc.) to locate and/or form vehicular micro cloud around. The identification may include physical attributes or characteristics of the object. For example, in the case of a target vehicle, the formation rules may include a vehicle color, license plate number, vehicle make and/or model, and the like. In another example, the task may be defined by as an inquiry, for example but not limited to, a measurement of parking availability, a risk level assessment of road conditions ahead of a traveling client device, etc.

The request from the client device 102 may also include, for example, parameters and/or sensor sets. Parameters may define a subset of connected vehicles that may be joined as micro cloud members. For example, parameters may include, but not limited to, information indicative of a make of vehicles (e.g., Toyota) that may be permitted to join the vehicular micro cloud, setting of a threshold maximum number of micro cloud members that may be permitted to join, enabling formation stationary and/or mobile vehicular micro clouds, etc. Sensor sets may be provided that define which sensors and/or results from vehicles 104 to be shared, for example, image sensors, proximity sensors, positioning data (e.g., GPS data), etc. In some embodiments, parameters and/or sensor sets may be defined by the server 110, in place of or in conjunction with the client device 102.

Although three vehicles 140, one RSU 108, one cloud server 110 and one network 106 are depicted in FIG. 1, in practice the operating environment may include one or more vehicles 140, one or more RSUs 108, one or more cloud servers 110 and one or more networks 106.

Figure 2:
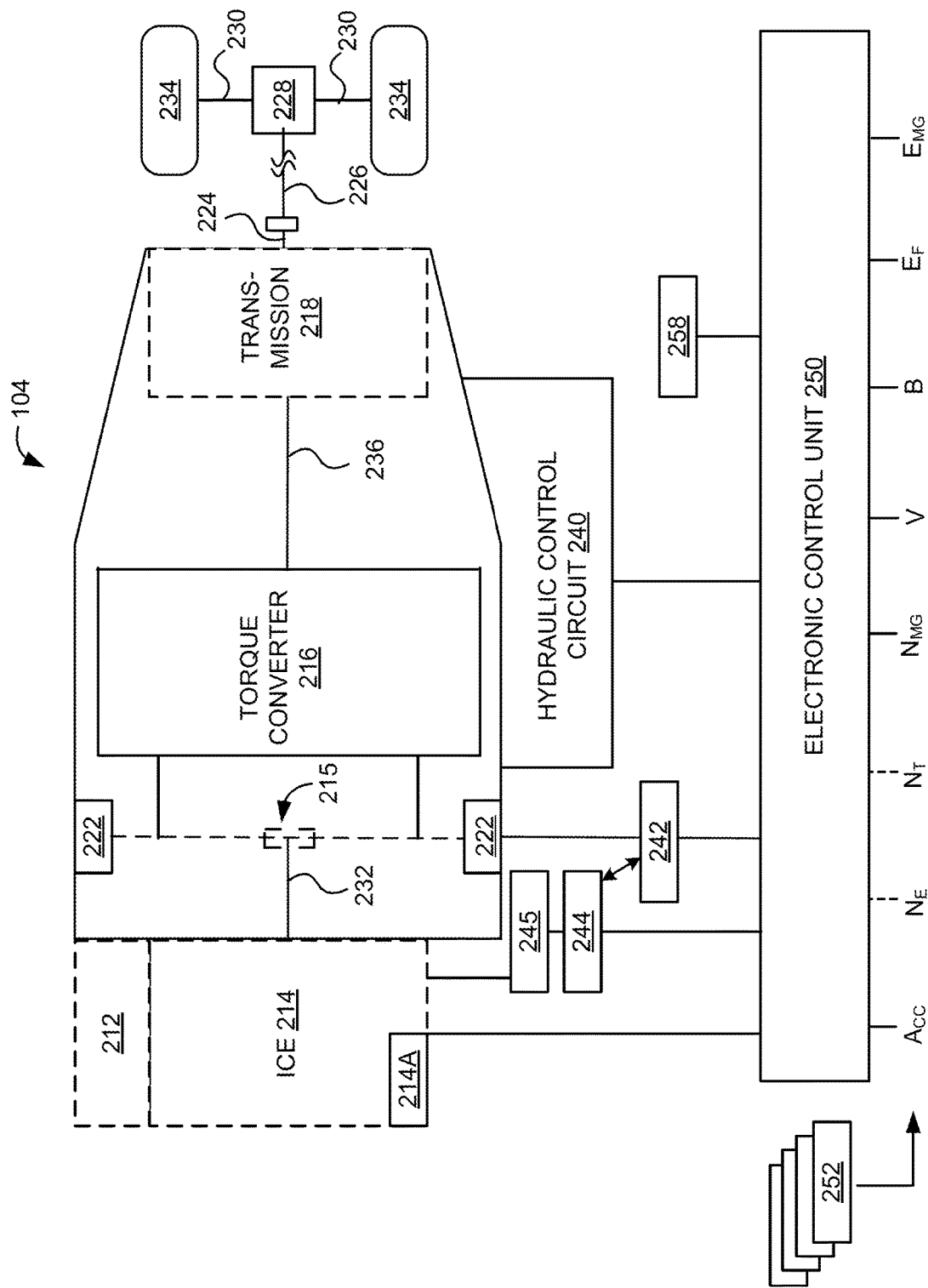
FIG. 2 is a schematic representation of an example hybrid vehicle with which embodiments of the systems and methods disclosed herein may be implemented.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 2. Although the example described with reference to FIG. 2 is a hybrid type of vehicle, the systems and methods for remote vehicular micro cloud formation can be implemented in other types of vehicles including gasoline- or diesel-powered vehicles, fuel-cell vehicles, electric vehicles, or other vehicles.

FIG. 2 illustrates a drive system of an example vehicle 104 that may include an internal combustion engine 214 and one or more electric motors 222 (which may also serve as generators) as sources of motive power. Driving force generated by the internal combustion engine 214 and motors 222 can be transmitted to one or more wheels 234 via a torque converter 216, a transmission 218, a differential gear device 228, and a pair of axles 230.

As an HEV, vehicle 104 may be driven/powered with either or both of engine 214 and the motor(s) 222 as the drive source for travel. For example, a first travel mode may be an engine-only travel mode that only uses internal combustion engine 214 as the source of motive power. A second travel mode may be an EV travel mode that only uses the motor(s) 222 as the source of motive power. A third travel mode may be an HEV travel mode that uses engine 214 and the motor(s) 222 as the sources of motive power. In the engine-only and HEV travel modes, vehicle 104 relies on the motive force generated at least by internal combustion engine 214, and a clutch 215 may be included to engage engine 214. In the EV travel mode, vehicle 104 is powered by the motive force generated by motor 222 while engine 214 may be stopped and clutch 215 disengaged.

Engine 214 can be an internal combustion engine such as a gasoline, diesel or similarly powered engine in which fuel is injected into and combusted in a combustion chamber. A cooling system 212 can be provided to cool the engine 214 such as, for example, by removing excess heat from engine 214. For example, cooling system 212 can be implemented to include a radiator, a water pump and a series of cooling channels. In operation, the water pump circulates coolant through the engine 214 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 214. In other applications, either or both the water pump and the fan may be operated by electric current such as from battery 244.

An output control circuit 214A may be provided to control drive (output torque) of engine 214. Output control circuit 214A may include a throttle actuator to control an electronic throttle valve that controls fuel injection, an ignition device that controls ignition timing, and the like. Output control circuit 214A may execute output control of engine 214 according to a command control signal(s) supplied from an electronic control unit 250, described below. Such output control can include, for example, throttle control, fuel injection control, and ignition timing control.

Motor 222 can also be used to provide motive power in vehicle 104 and is powered electrically via a battery 244. Battery 244 may be implemented as one or more batteries or other power storage devices including, for example, lead-acid batteries, nickel-metal hydride batteries, lithium ion batteries, capacitive storage devices, and so on. Battery 244 may be charged by a battery charger 245 that receives energy from internal combustion engine 214. For example, an alternator or generator may be coupled directly or indirectly to a drive shaft of internal combustion engine 214 to generate an electrical current as a result of the operation of internal combustion engine 214. A clutch can be included to engage/disengage the battery charger 245. Battery 244 may also be charged by motor 222 such as, for example, by regenerative braking or by coasting during which time motor 222 operate as generator.

Motor 222 can be powered by battery 244 to generate a motive force to move the vehicle and adjust vehicle speed. Motor 222 can also function as a generator to generate electrical power such as, for example, when coasting or braking. Battery 244 may also be used to power other electrical or electronic systems in the vehicle. Motor 222 may be connected to battery 244 via an inverter 242. Battery 244 can include, for example, one or more batteries, capacitive storage units, or other storage reservoirs suitable for storing electrical energy that can be used to power motor 222. When battery 244 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 250 (described below) may be included and may control the electric drive components of the vehicle as well as other vehicle components. For example, electronic control unit 250 may control inverter 242, adjust driving current supplied to motor 222, and adjust the current received from motor 222 during regenerative coasting and breaking. As a more particular example, output torque of the motor 222 can be increased or decreased by electronic control unit 250 through the inverter 242.

A torque converter 216 can be included to control the application of power from engine 214 and motor 222 to transmission 218. Torque converter 216 can include a viscous fluid coupling that transfers rotational power from the motive power source to the driveshaft via the transmission. Torque converter 216 can include a conventional torque converter or a lockup torque converter. In other embodiments, a mechanical clutch can be used in place of torque converter 216.

Clutch 215 can be included to engage and disengage engine 214 from the drivetrain of the vehicle. In the illustrated example, a crankshaft 232, which is an output member of engine 214, may be selectively coupled to the motor 222 and torque converter 216 via clutch 215. Clutch 215 can be implemented as, for example, a multiple disc type hydraulic frictional engagement device whose engagement is controlled by an actuator such as a hydraulic actuator. Clutch 215 may be controlled such that its engagement state is complete engagement, slip engagement, and complete disengagement complete disengagement, depending on the pressure applied to the clutch. For example, a torque capacity of clutch 215 may be controlled according to the hydraulic pressure supplied from a hydraulic control circuit (not illustrated). When clutch 215 is engaged, power transmission is provided in the power transmission path between the crankshaft 232 and torque converter 216. On the other hand, when clutch 215 is disengaged, motive power from engine 214 is not delivered to the torque converter 216. In a slip engagement state, clutch 215 is engaged, and motive power is provided to torque converter 216 according to a torque capacity (transmission torque) of the clutch 215.

As alluded to above, vehicle 104 may include an electronic control unit 250. Electronic control unit 250 may include circuitry to control various aspects of the vehicle operation. Electronic control unit 250 may include, for example, a microcomputer that includes a one or more processing units (e.g., microprocessors), memory storage (e.g., RAM, ROM, etc.), and I/O devices. The processing units of electronic control unit 250, execute instructions stored in memory to control one or more electrical systems or subsystems 258 in the vehicle. Electronic control unit 250 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 2, electronic control unit 250 receives information from a plurality of sensors included in vehicle 104. For example, electronic control unit 250 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 214 (engine RPM), a rotational speed, $N_{MG}$, of the motor 222 (motor rotational speed), and vehicle speed, $N_V$.

These may also include torque converter 216 output, $N_T$ (e.g., output amps indicative of motor output), brake operation amount/pressure, B, battery SOC (i.e., the charged amount for battery 244 detected by an SOC sensor). Accordingly, vehicle 104 can include a plurality of sensors 252 that can be used to detect various conditions internal or external to the vehicle and provide sensed conditions to engine control unit 250 (which, again, may be implemented as one or a plurality of individual control circuits). In one embodiment, sensors 252 may be included to detect one or more conditions directly or indirectly such as, for example, fuel efficiency, $E_F$, motor efficiency, $E_{MG}$, hybrid (internal combustion engine 214+MG 212) efficiency, acceleration, $A_{CC}$, etc.

In some embodiments, one or more of the sensors 252 may include their own processing capability to compute the results for additional information that can be provided to electronic control unit 250. In other embodiments, one or more sensors may be data-gathering-only sensors that provide only raw data to electronic control unit 250. In further embodiments, hybrid sensors may be included that provide a combination of raw data and processed data to electronic control unit 250. Sensors 252 may provide an analog output or a digital output.

Sensors 252 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect objects in an environment surrounding vehicle 104, for example, traffic signs indicating a current speed limit, road curvature, obstacles, surrounding vehicles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 2 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 3:
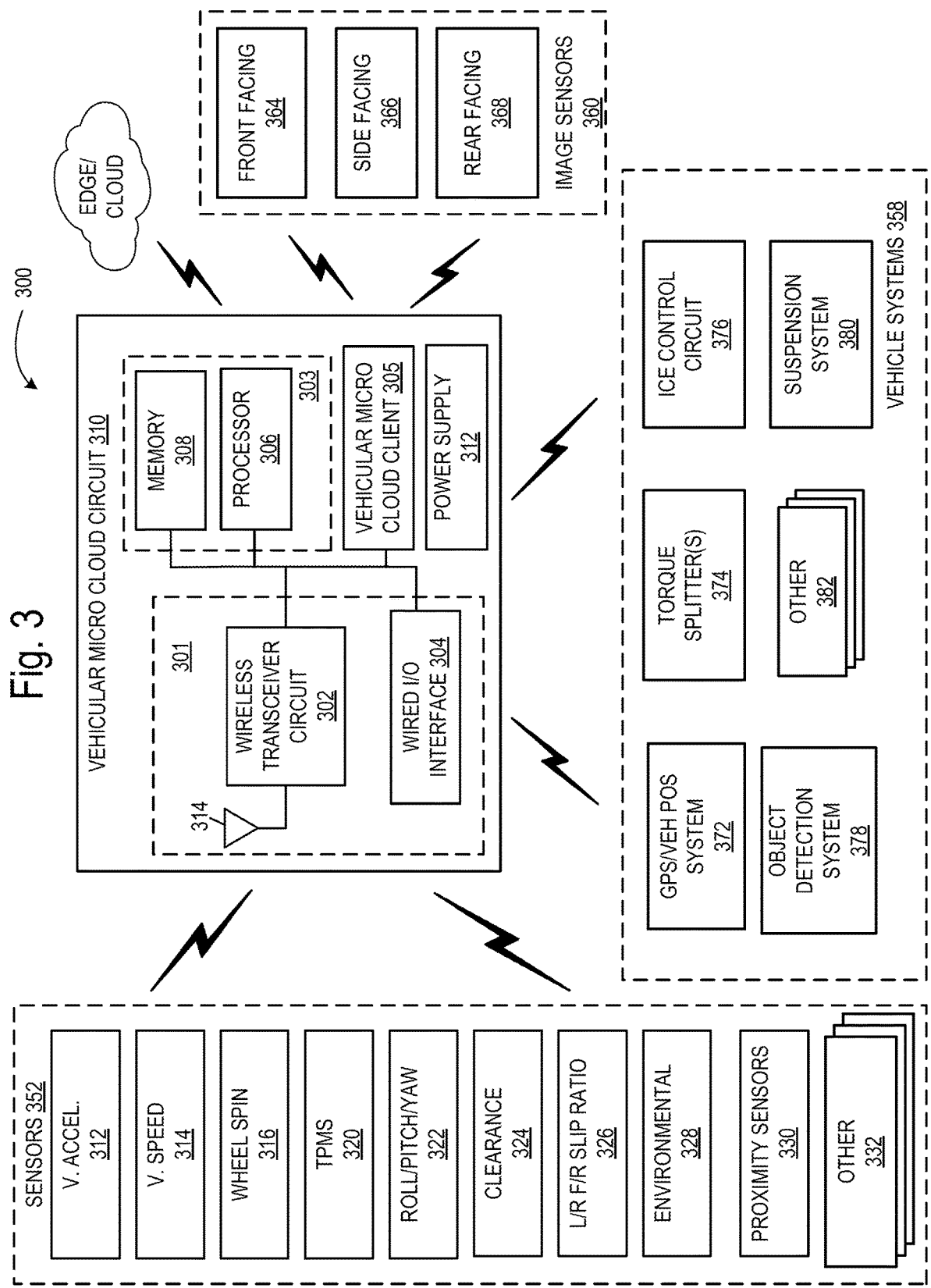
FIG. 3 illustrates an example architecture for remote vehicular micro cloud formation in accordance with one embodiment of the systems and methods described herein.

FIG. 3 illustrates an example architecture for remote vehicular micro cloud formation in accordance with one embodiment of the systems and methods described herein. Referring now to FIG. 3, in this example, vehicular micro cloud system 300 includes a vehicular micro cloud circuit 310, a plurality of sensors 352 and a plurality of vehicle systems 358. Sensors 352 (such as sensors 252 described in connection with FIG. 2) and vehicle systems 358 (such as systems 258 described in connection with FIG. 2) can communicate with vehicular micro cloud circuit 310 via a wired or wireless communication interface. Although sensors 352 and vehicle systems 358 are depicted as communicating with vehicular micro cloud circuit 310, they can also communicate with each other as well as with other vehicle systems. Vehicular micro cloud circuit 310 can be implemented as an ECU or as part of an ECU such as, for example electronic control unit 350. In other embodiments, vehicular micro cloud circuit 310 can be implemented independently of the ECU.

Vehicular micro cloud circuit 310 in this example includes a communication circuit 301, a decision circuit 303 (including a processor 306 and memory 308 in this example) and a power supply 312. Components of vehicular micro cloud circuit 310 are illustrated as communicating with each other via a data bus, although other communication in interfaces can be included. Vehicular micro cloud circuit 310 in this example also includes a vehicular micro cloud client 305 that can be operated to join/exit a vehicular micro cloud and collaborate on a task by communicating resource data collected from sensors 352 and/or vehicle system 358 to a micro cloud leader via communication circuit 301.

Processor 306 can include one or more GPUs, CPUs, microprocessors, or any other suitable processing system. Processor 306 may include a single core or multicore processors. The memory 308 may include one or more various forms of memory or data storage (e.g., flash, RAM, etc.) that may be used to store instructions and variables for processor 306 as well as any other suitable information, such as, one or more of the following elements: rules data; resource data; GPS data; and base data, as described below. Memory 308 can be made up of one or more modules of one or more different types of memory, and may be configured to store data and other information as well as operational instructions that may be used by the processor 306 to vehicular micro cloud circuit 310.

Although the example of FIG. 3 is illustrated using processor and memory circuitry, as described below with reference to circuits disclosed herein, decision circuit 303 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a vehicular micro cloud circuit 310.

Communication circuit 301 includes either or both a wireless transceiver circuit 302 with an associated antenna 314 and a wired I/O interface 304 with an associated hardwired data port (not illustrated). Communication circuit 301 can provide for V2X and/or V2V communications capabilities, allowing vehicular micro cloud circuit 310 to communicate with edge devices, such as roadside unit/equipment (RSU/RSE), network cloud servers and cloud-based databases, and/or other vehicles.

As this example illustrates, communications with vehicular micro cloud circuit 310 can include either or both wired and wireless communications circuits 301. Wireless transceiver circuit 302 can include a transmitter and a receiver (not shown) to allow wireless communications via any of a number of communication protocols such as, for example, Wi-Fi, Bluetooth, near field communications (NFC), Zigbee, and any of a number of other wireless communication protocols whether standardized, proprietary, open, point-to-point, networked or otherwise. Antenna 314 is coupled to wireless transceiver circuit 302 and is used by wireless transceiver circuit 302 to transmit radio signals wirelessly to wireless equipment with which it is connected and to receive radio signals as well. These RF signals can include information of almost any sort that is sent or received by vehicular micro cloud circuit 310 to/from other entities such as sensors 352 and vehicle systems 358.

Wired I/O interface 304 can include a transmitter and a receiver (not shown) for hardwired communications with other devices. For example, wired I/O interface 304 can provide a hardwired interface to other components, including sensors 352 and vehicle systems 358. Wired I/O interface 304 can communicate with other devices using Ethernet or any of a number of other wired communication protocols whether standardized, proprietary, open, point-to-point, networked or otherwise.

Power supply 310 can include one or more of a battery or batteries (such as, e.g., Li-ion, Li-Polymer, NiMH, NiCd, NiZn, and $NiH_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 352 can include, for example, sensors 352 such as those described above with reference to the example of FIG. 3. Sensors 352 can include additional sensors that may or may not otherwise be included on a standard vehicle 300 with which the vehicular micro cloud system 300 is implemented. In the illustrated example, sensors 352 include vehicle acceleration sensors 312, vehicle speed sensors 314, wheelspin sensors 316 (e.g., one for each wheel), a tire pressure monitoring system (TPMS) 320, accelerometers such as a 3-axis accelerometer 322 to detect roll, pitch and yaw of the vehicle, vehicle clearance sensors 324, left-right and front-rear slip ratio sensors 326, environmental sensors 328 (e.g., to detect salinity or other environmental conditions), and proximity sensor 330 (e.g., sonar, radar, lidar or other vehicle proximity sensors). Additional sensors 332 can also be included as may be appropriate for a given implementation of vehicular micro cloud system 300.

System 300 may be equipped with image sensors 360. These may include front facing image sensors 364, side facing image sensors 366, and/or rear facing image sensors 368. Image sensors may capture information which may be used in detecting not only vehicle conditions but also detecting conditions external to the vehicle 300 as well. Image sensors that might be used to detect external conditions can include, for example, cameras or other image sensors configured to capture data in the form of sequential image frames forming a video in the visible spectrum, near infra-red (IR) spectrum, IR spectrum, ultra violet spectrum, etc. Image sensors 360 can be used to, for example, to detect objects in an environment surrounding vehicle 300, for example, traffic signs indicating a current speed limit, road curvature, obstacles, surrounding vehicles, and so on. For example, a one or more image sensors 360 may capture images of neighboring vehicles in the surrounding environment. As another example, object detecting and recognition techniques may be used to detect objects and environmental conditions, such as, but not limited to, road conditions, surrounding vehicle behavior (e.g., driving behavior and the like), parking availability, etc. Additionally, sensors may estimate proximity between vehicles. For instance, the image sensors 360 may include cameras that may be used with and/or integrated with other proximity sensors 330 such as LIDAR sensors or any other sensors capable of capturing a distance. As used herein, a sensor set of a vehicle may refer to sensors 352 and image sensors 360 as a set.

Vehicle systems 358, for example, systems and subsystems 358 described above with reference to the example of FIG. 3, can include any of a number of different vehicle components or subsystems used to control or monitor various aspects of the vehicle and its performance. In this example, the vehicle systems 358 includes a GPS or other vehicle positioning system 372; torque splitters 374 that can control distribution of power among the vehicle wheels such as, for example, by controlling front/rear and left/right torque split; engine control circuits 376 to control the operation of engine (e.g. Internal combustion engine 34); object detection system 378 to perform image processing such as object recognition and detection on images from image sensors 360, proximity estimation, for example, from image sensors 360 and/or proximity sensors, etc. for use in other vehicle systems; suspension system 380 such as, for example, an adjustable-height air suspension system, or an adjustable-damping suspension system; and other vehicle systems 382 (e.g., (e.g., Advanced Driver-Assistance Systems (ADAS), such as forward/rear collision detection and warning systems, pedestrian detection systems, autonomous or semi-autonomous driving systems, and the like).

During operation, vehicular micro cloud circuit 310 can receive an invitation to join a vehicular micro cloud, for example, through communication with an edge or cloud server. The invitation to join the vehicular micro cloud may include an indication of a collaborative task for which the vehicular micro cloud is formed, and in some examples an indication of resources to be shared (e.g., indication of sensors and/or results from systems to be shared). Based on the indicated task, the vehicular micro cloud circuit 310 receives information from various vehicle sensors 352, image sensors 360, and/or systems 358 related to indicated task. Communication circuit 301 can be used to transmit and receive information between vehicular micro cloud circuit 310 and sensors 352, vehicular micro cloud circuit 310 and image sensors 360, and vehicular micro cloud circuit 310 and vehicle systems 358. Also, sensors 352 and/or image sensors 360 may communicate with vehicle systems 358 directly or indirectly (e.g., via communication circuit 301 or otherwise). For example, an invitation to join a vehicular micro cloud may be received for collaborating on a task, such as locating an unconnected object (e.g., an unconnected vehicle or other object), measure parking availability, and roadway risk assessment, to name a few examples. Image sensors 360 may capture a plurality of image frames of the surrounding environment. The image frames may be communicated to the vehicular micro cloud circuit 310, which transmits the images to an edge/cloud server. In some embodiments, the image frames may be communicated to systems 358, which perform object recognition and detection techniques via object detection system 378 to detect the unconnected vehicle, open parking spaces, risk level assessment, etc. The image frames may include metadata, such as (i) a label of the task, for example but not limited to, such as an indication that the unconnected vehicle was detected int eh image frame, a measurement of parking availability, risk level assessment; (ii) a timestamp of a time at which each image was captured; and (iii) a GPS coordinate (e.g., from GPS or other vehicle positioning system 372) indicating a geographic location at which the image was captured by the image sensors 360. The captured image frames and associated metadata may be communicated to the cloud server.

Figure 4:
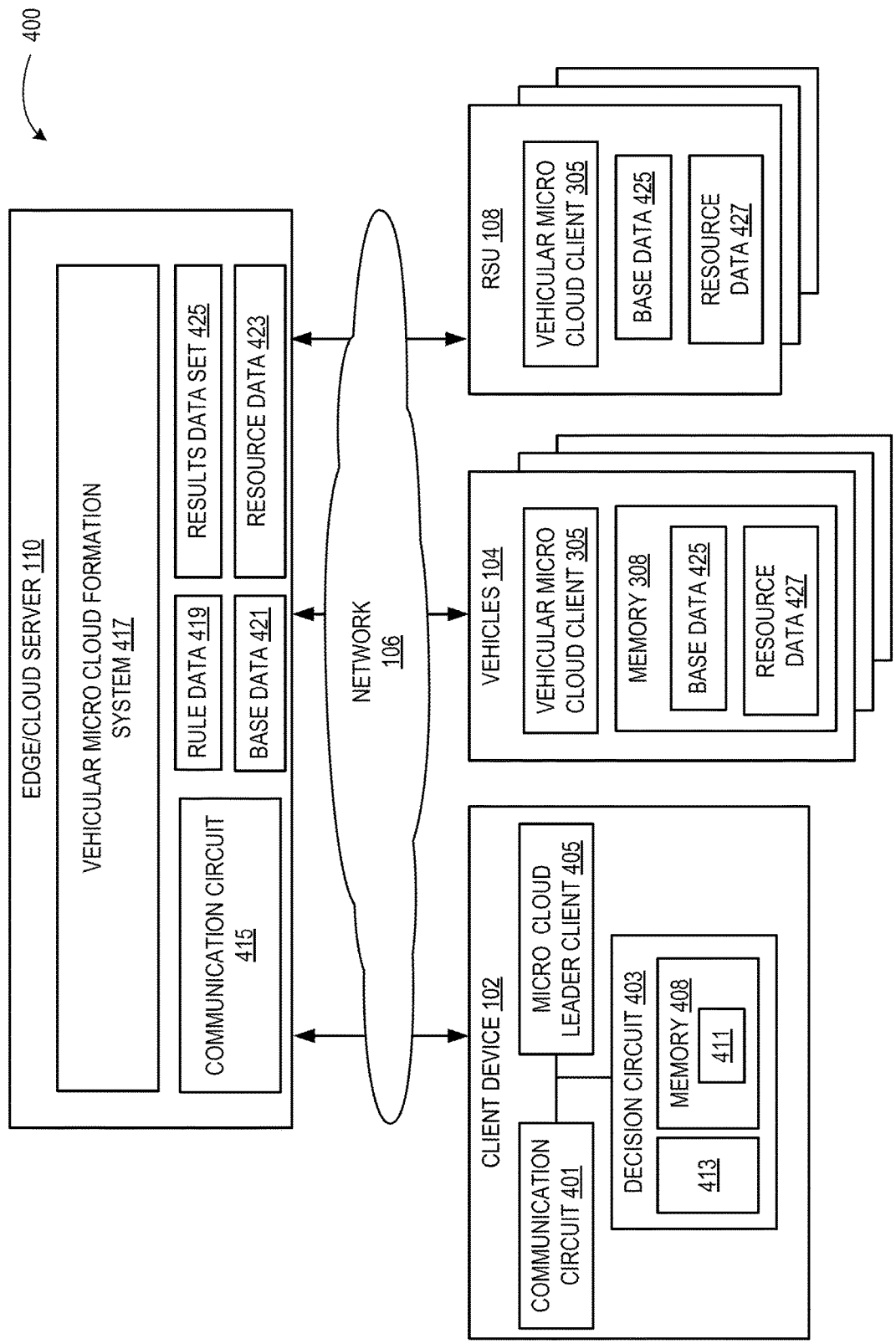
FIG. 4 depicts a schematic block diagram illustrating an overview of an example system for forming remote vehicular micro clouds in accordance with embodiments of the systems and methods described herein.

FIG. 4 depicts a schematic block diagram illustrating an overview of an example system 400 for remote vehicular micro cloud formation in accordance with embodiments of the systems and methods described herein. The system 400 is another representation of the operating environment 100 of FIG. 1. System 400 includes one or more vehicles 104 (e.g., as described above in connection with FIGS. 1-3), one or more one or more roadside units or other infrastructure devices 108 and a cloud server 110. The one or more vehicles 104 may each provide similar functionality and are referred to herein "vehicle 104" individually or collectively. The one or more roadside units or other infrastructure devices 108 may provide similar functionality and are referred to herein as "RSU 108" individually or collectively. These elements of the system 400 may be communicatively coupled to network 106.

Client device 102 in this example includes a communication circuit 401 and a decision circuit 403 (including a processor 413 and memory 408). For example, client device 102 can be implemented as a computing component, such as computing component 1000 of FIG. 10. Client device 102 in this example also includes a micro cloud leader client 405 that can be operated to communicate a request to form of a vehicular micro cloud to server 110 (e.g., to a cloud server) for execution of a task and receive collaborative results on the task from the server 110 via communication circuit 401. Components of client device 102 are illustrated as communicating with each other via a data bus, although other communication in interfaces can be included.

The memory 408 may include one or more various forms of memory or data storage (e.g., flash, RAM, etc.) that may be used to store instructions and variables for processor as well as any other suitable information, such as, rules data 411. Rules data 411 includes digital data that controls formation rules, parameters, and/or sensor sets for which a vehicular micro cloud is requested by the client device 102 via micro cloud leader client 405. For example, digital data of formation rules, parameters, and/or sensor sets may be created and stored responsive to inputs into client device 102 from a user via a user interface.

The micro cloud leader client 405 includes code and routines that are operable, when executed by a processor 413 of the client device 102, to cause the processor 413 to: receive the rules data 411 from the from the memory 408; generate a request for formation of a vehicular micro cloud according to the rules data 411; and transmit the request to the sever 110. The micro cloud leader client 405 also includes code and routines that are operable to: receive detection results from the server 110 pertaining to the task indicated in the request and present the results to the user of the client device, for example, via a graphical user interface generated on a display screen.

The server 110 includes a vehicular micro cloud formation system 417 and a communication circuit 415. The server 110 can be implemented, for example, as a computing component, such as computing component 1000 of FIG. 10. The server 110 receives rule data 411 from client device 102 via communication circuit 415 over the network 106. The server 110 stores the received rule data as rule data 419 in a database (e.g., database 112 of FIG. 1), along with base data 421.

The base data 421 includes digital data that defines a remote vehicular micro cloud template. In some embodiments, the remote vehicular micro cloud template maintains a set of parameters for forming a remote vehicular micro cloud, and, upon receipt of the rule data with a request from the client device, may cause formation of an on-demand vehicular micro cloud. For example, the remote vehicular micro cloud template includes program codes used for converting a target geographic region included in rule data 419 (e.g., rule data received from the client device and stored in a database) into one or more geographic locations at which one or more vehicular micro clouds can be formed. Converting the target region may include identifying candidate locations, such as intersections, where a vehicular micro cloud may be formed to achieve the desired task. Candidate locations may be based on availability of a proxy micro cloud leader (e.g., a vehicle or RSU) around which a vehicular micro cloud may be formed. For example, a target region may be converted to a plurality of locations (e.g., plurality of intersections, addresses, structures, etc.) included in the target region where a potential proxy micro cloud leader is located. The remote vehicular micro cloud template also includes program codes used for converting a task indicated in the request from client device 102 to one or more operational tasks to be executed by micro cloud members of the vehicular micro cloud. For example, a request to locate a target vehicle can be converted to instructions to share data captured by proximity sensors and image sensors of vehicles 104 to locate nearby vehicles and detect the target vehicle according to physical attributes and/or characteristics of the target vehicle. Further, the remote vehicular micro cloud template may include program codes used for defining a set of termination conditions (e.g., lifespan) of the on-demand vehicular micro cloud; one or more tasks to be executed in the on-demand vehicular micro cloud; limiting a number of micro cloud members; filtering requests from multiple client devices for vehicular micro cloud formation; and/or defining sensor sets of vehicles 104 implemented in the collaborative task.

The vehicular micro cloud formation system 417 includes software that is operable, when executed by the server 110, to cause the server 110 to execute one or more of the following operations: (1) receiving a request from the client device 102 for an on-demand vehicular micro cloud to collaborate on a task; (2) determining whether one vehicular micro cloud is sufficient for the task or if a plurality of vehicular micro clouds are needed; (3) determining whether to form the one or more vehicular micro clouds as stationary and/or mobile vehicular micro clouds; (4) forming an on-demand vehicular micro cloud; and (5) causing the on-demand one or more vehicular micro cloud generated at operation (3) to coordinate execution of one or more tasks that are described by the base data 421. Further, the vehicular micro cloud formation system 417 may select one or more candidate locations from the base data 419 as locations for forming a vehicular micro cloud. For example, it may be the case that not every intersection within a target region is needed, and instead a subset of the candidate locations may be used to cover an optimal portion of the target region (e.g., three, four, etc. as desired) to achieve the requested task.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

The vehicular micro cloud formation system 417 may cause the server 110 to designate the client device 102 as the micro cloud leader of the generated one or more vehicular micro clouds, regardless as to whether or not the client device is physically located with the geographic area defining the vehicular micro cloud. The server 110 then communicates results from the vehicular micro cloud, pertaining to the task, to the client device 102.

Further, the vehicular micro cloud formation system 417 may cause the server 110 to execute one or more of the following operations: detecting candidate micro cloud members (e.g., vehicles 104 enter/leaving the area of the vehicular micro cloud); selecting one or more candidate micro cloud members to join the established vehicular micro cloud by communicating base data 421 to micro cloud members; receiving multiple instances of resource data 423 from micro cloud members; aggregating and processing the resource data to form a results data set 425 pertaining to the task; and transmitting the results data set 425 to the micro cloud leader client 405 of the client device 102 via the network 106.

Additional details related to forming vehicular micro clouds are described in U.S. application Ser. No. 15/845,945 and U.S. application Ser. No. 16/246,334, the disclosures of which are each incorporated herein by reference in their entirety.

As alluded to above, vehicle 104 includes vehicular micro cloud client 305. The vehicular micro cloud client 305 includes code and routines that are operable, when executed by a processor 306 of the vehicle 104, to cause the processor 306 to: receive base data 421 from server 110 and store base data as base data 425 so to join the vehicular micro cloud; execute one or more tasks that are described by the base data 421 through sensors 352, systems 358, and/or image sensors 360; collect resource data 427 from system 358, sensors 352 and/or image sensors 360 according to base data 426; and transmit results of the executed one or more tasks to server 110 as resource data 427. While vehicle 104 is shown as including client 305 and memory 308, it will be appreciated that vehicle 104 can include the system 300 of FIG. 3 and all accompanying complements described therein.

The RSU 108 includes a vehicular micro cloud client 429 and a communication circuit 431. The RSU 108 can be implemented, for example, as a computing component, such as computing component 1000 of FIG. 10. The vehicular micro cloud client 429 includes code and routines that are operable, when executed, to cause the RSU 108 to perform similar functionality as described above in connection with client 305 based on base data 425 so to collect sensor data 427 and transmit sensor data 427 to the server 110. The RSU 108 may comprise sensors similar to those of vehicle 104. For example, RSU 108 may include one or more of sensors 352 and/or image sensors 360 as described above. RSU 108, as a roadside equipment, may have known geographic coordinates and/or comprises a GPS unit of its own.

Figure 5A:
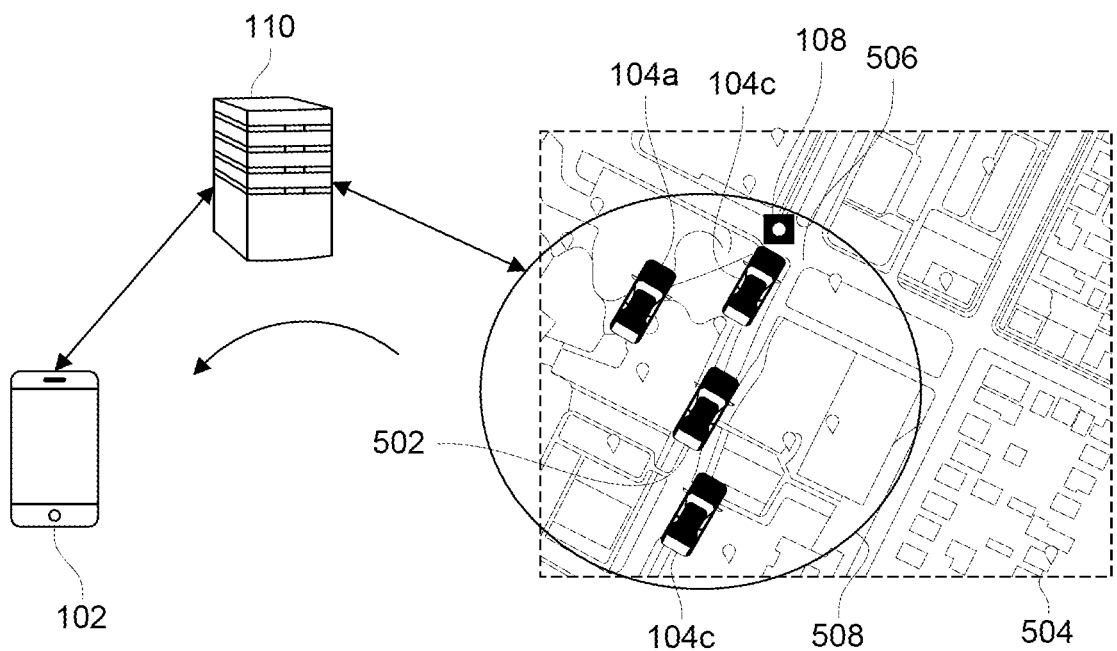
FIG. 5A is a schematic diagram of remote vehicular micro cloud formation for locating a target vehicle according to an embodiment described herein.

FIG. 5A is a schematic diagram of remote vehicular micro cloud formation for locating a target vehicle according to an embodiment described herein. FIG. 5A depicts a use case where a remote user, operating client device 102, seeks to locate a vehicle 502 within a geographic region 504, such as an urban area. To achieve this goal, client device 102 can be operated to request remote assistance for locating the vehicle 502 and communicate with server 110 to form remote vehicular micro cloud 508 at location 506. The client device 102 become the micro cloud leader. Connected vehicles 104 within a defined area of location 506 join the vehicular micro cloud 508 and share capabilities and resources to execute the task of locating vehicle 502. Through micro cloud 508, vehicles 104 can collaborate on the task of providing a precise location of the unconnected vehicle 502 by leveraging their respective sensor sets (e.g., sensors 352, systems 358, and/or image sensors 360 of FIG. 3).

For example, remote vehicular micro cloud formation starts with the client device 102 generating the request including formation rules (e.g., packaged as rule data 411). The request includes identification of target geographic region 504 in which the vehicle 502 is expected or believed to be and information defining the task (e.g., request to locate vehicle 502 and identifying characteristics and attributes of the vehicle 502). The request is transmitted to server 110 over the network.

Receipt of the request at the server 110 triggers formation of an on-demand remote vehicular micro cloud 508 at a location 506 within the geographic region 504. For example, the server 110 checks the request and obtains rule data 411 received from the client device 102, base data 421 converts the target geographic region 514 into candidate geographic locations. The candidate geographic locations may be, for example, intersections within the target geographic region.

The server 110 selects a candidate location as a location at which the remote vehicular micro cloud 508 can be established, for example, by establishing a V2X communication with one or more of vehicles 104 and RSU 108 as micro cloud members. For example, candidate geographic locations can be filtered according to locations at which a connected vehicles and/or RSUs capable of V2X communications are present. In some embodiments, the server 110 may identify intersections that the vehicle 502 is expected to cross. For example, high traffic intersections may be selected, a number of intersections around the region forming a bounded region, etc. Once a location is selected, the server 110 forms the remote vehicular micro cloud 508 over a defined physical area around the selected location. For example, the server 110 detects vehicles 104 and RSU 108 within the defined area and communicates with the detected entities to form the vehicular micro cloud 508.

Upon forming the remote vehicular micro cloud, the server 110 designates the client device 102 as the micro cloud leader and the connected vehicles 104 and RSU 108 become micro cloud members. In the case of a stationary micro cloud, in some embodiments, RSU 108 at location 506 may be designated as a proxy micro cloud leader serving as a center of the vehicular micro cloud. In another example, a connected vehicle 104 may be designated as a proxy micro cloud leader, which may be handed off if/when the vehicle exits the vehicular micro cloud area.

The server 110 detects connected vehicles that enter the defined area of the micro cloud 508 and joins the connected vehicles to the micro cloud 508. Micro cloud members collaborate on the task of locating the unconnected vehicle 502 lead by the micro cloud leader. For example, micro cloud members collect respective resource data 427 (e.g., image frame/video feed data, GPS coordinates, proximity data, and the like) of the environment surrounding the geographic location and respectively transmit the resource data 427 to the server 110. The resource data 427 is stored in aggregate as resource data 423 and processed to determine a result of the task. For example, respective resource data 427 may be provided to server 110, which the sever 110 processes to detect the vehicle 502 and identify a position thereof.

For example, each vehicle 104 may share respective image frames and/or video feeds captured by image sensors 360 with the server 110. The image frames and/or video feeds may be stored as resource data 423, along with respective GPS data (e.g., geographic coordinates) from each vehicle 104. The vehicular micro cloud formation system 417 may can include instructions to combine or "stitch" the image frames/video feeds together into a panoramic image frame/video feed in accordance with respective positions of the vehicles 104 relative to the vehicle 502. That is, vehicular micro cloud formation system 417 can determine that image frames from micro cloud members contain portions of an environment beside each other and portions covering overlapping areas. The vehicular micro cloud formation system 417 can include instructions to identify overlapping portions of image frames/video feeds and crop the image frame/video feeds as required to stitch the image frames/video feeds together and approximate a continuous view. In one or more embodiments, a stitched image frame/video feed can provide at least a 270-degree panoramic view of the environment surrounding location 506. In one or more embodiments, when possible, a stitched image frame/video feed can provide a full 360-degree panoramic view of the environment surrounding location 506. The stitched image frame/video feed can then be stored as results data set 425. Additional details regarding stitching of video streams from a vehicular micro cloud can be found, for example, in U.S. application Ser. No. 16/831,042, the disclosure of which is incorporated herein by reference in its entirety.

From the stitched image frame/video feed, the vehicular micro cloud formation system 417 can perform object recognition and detection techniques to identify vehicle 502 in the stitched image frame/video feed. By associating the stitched image frame/video feed with respective GPS data from the vehicles 104, a location of the vehicle 502 can be determined and stored with the results data set 423. The vehicular micro cloud formation system 417 communicates the results data set 423 to the micro cloud leader client 405 on the client device 102, which can present the results to the user.

In some embodiments, each vehicle 104 may perform object recognition on respective image frames/video feeds to detect the vehicle 502. Thus, in this case, only those image frames/video feeds containing the vehicle 502 need be shared with the server 110. The server 110 can then stitch the received image frames/video feeds, as set forth above, and store the stitched image frame/video feed to the results data set 425.

In some embodiments, the vehicular micro cloud 508 may be a stationary vehicular micro cloud at a geographic location 506, for example, at an intersection within the designated geographic region. In other embodiments, the vehicular micro cloud may be mobile, for example, coupled to a connected vehicle 104 designated as a proxy micro cloud leader for the purpose of moving the mobile vehicular micro cloud with the proxy micro cloud leader.

Figure 5B:
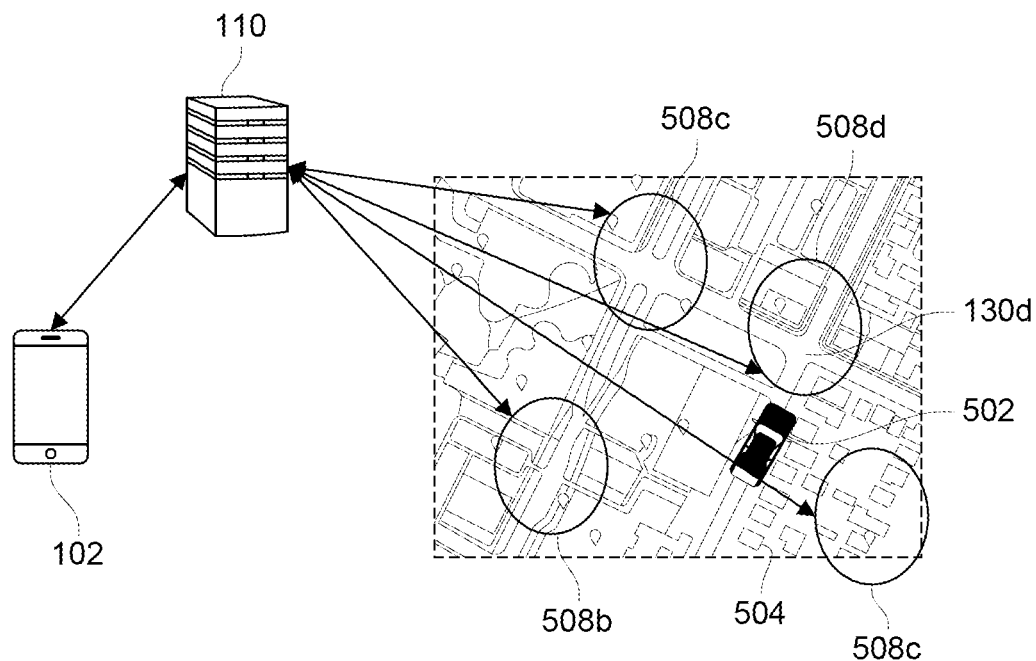
FIG. 5B is a schematic diagram of forming a plurality of remote vehicular micro clouds for locating a target vehicle according to an embodiment described herein.

In some embodiments, one or more vehicular micro clouds may be formed at one or more geographic locations within the designated geographic region, which may include one or more stationary vehicular micro clouds, one or more mobile vehicular micro clouds, and/or a combination thereof. For example, FIG. 5B depicts a schematic diagram illustrating a process for forming a plurality of remote vehicular micro clouds. The process illustrated in FIG. 5B is similar to that of FIG. 5A, except that the server 110 selected multiple locations for forming multiple vehicular micro clouds 508a-508d. Each vehicular micro cloud 508a-508d functions in a similar manner, thus a larger portion of the geographic region 504 can be used to detect the unconnected vehicle 502 as it travels.

In some embodiments, the client device 102 may receive updates from the server 110 as the vehicle 502 travels. For example, as vehicle 502 exits the area of a vehicular micro cloud 508, the server 110 can select another location for forming a vehicular micro cloud so to track the vehicle 502 while it moves about the target region 504. The results data sets 423 can be updated with new positions and stitched image frames/video frames, which can be communicated to the client device 102. Thus, the client device 102 can be continuously updated with recent position information to track the target vehicle.

While the preceding examples are described with reference to locating a vehicle 502, the present disclosure is not so limited. The embodiments disclosed herein may be implemented to locate any object (e.g., a person, place, thing, etc.) in a manner similar to that set forth above with respect to vehicle 502. For example, the request from client device 102 may include physical characteristics or identifying attributes of any object and leverage a remote vehicular micro cloud to locate the described object.

Figure 6:
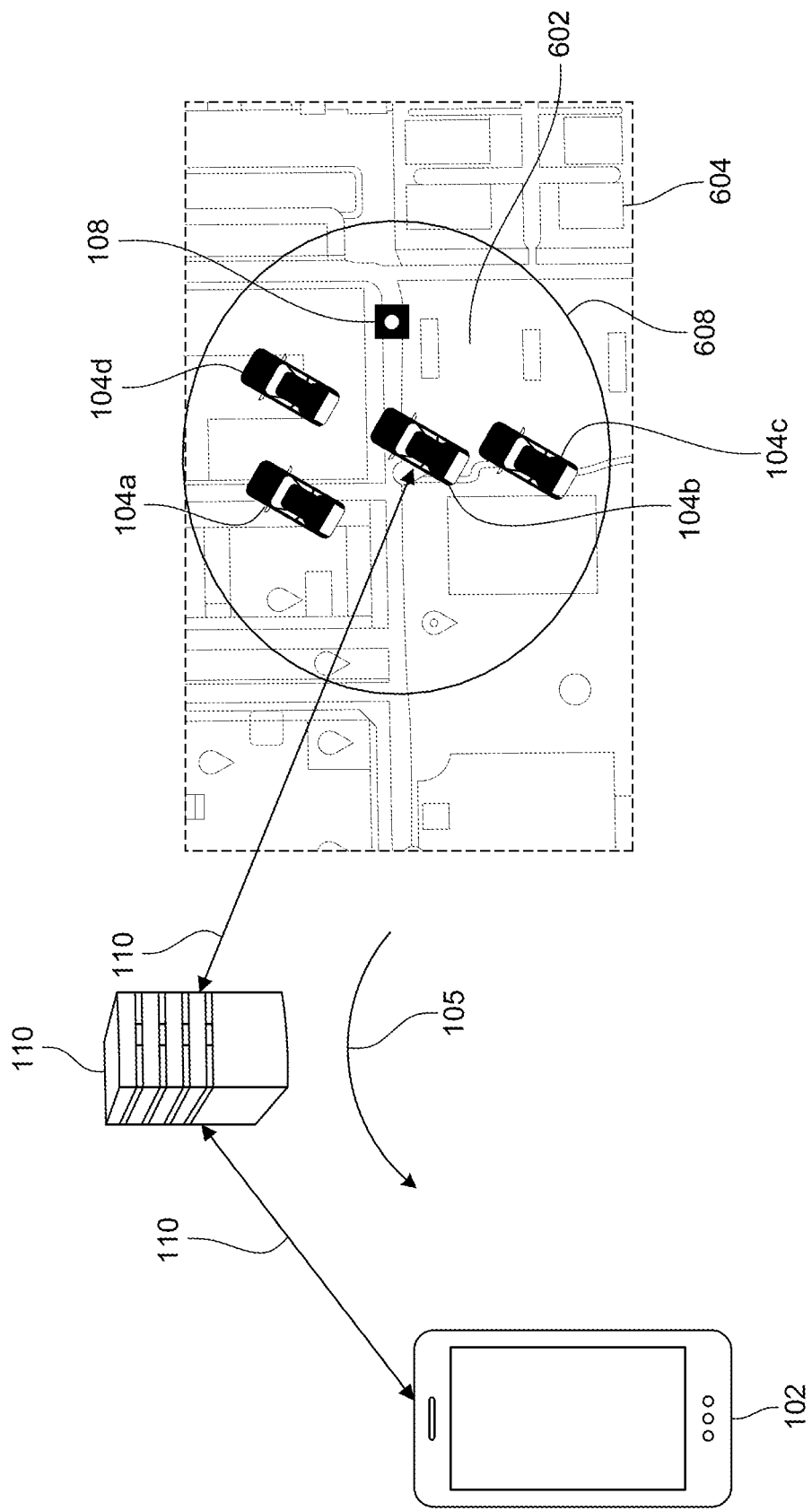
FIG. 6 is a schematic diagram of remote vehicular micro cloud formation for parking availability measurements according to an embodiment described herein.

FIG. 6 is a schematic diagram of remote vehicular micro cloud formation for parking availability measurements according to an embodiment described herein. In the case of FIG. 6, a remote user, operating client device 102, may wish to know parking availability within a geographic region 604. To achieve this goal, client device 102 can be operated to request formation of one or more remote vehicular micro clouds 608 (one vehicular micro cloud is shown in this example) to connect with connected vehicles in the proximate vicinity of parking areas to collaborate on the task of measuring parking availability.

Accordingly, similar to the example shown in FIGS. 5A and 5B, client device 102 generates a request for formation of a vehicular micro cloud including formation rules (e.g., packaged as rule data 411). The request can include identification of target geographic region 604 in which the parking availability is to be measured and/or an identification of a target parking area 602 having a known location (e.g., by address, geographic coordinates, name, etc.). The request triggers formation of vehicular micro clouds 608 at a selected candidate position (as described above) or at the identified target location in a manner substantially similar to that process of FIGS. 5A and 5B. Thus, micro cloud members may join the vehicular micro cloud 608 and share sensor data 427, which can be used to measure the parking availability.

For example, vehicles 104 can capture image frames/video feeds of the environment surrounding parking area 602. As described above, the image frames/video feeds can be stitched together to provide a stitched image frame/video feed. From the stitched image frame/video feed, object recognition and detection techniques can be implemented to process the image frame/video feed so to identify parking space and determined whether the identified parking space is occupied or available. The number of available spaces and/or a percentage of available spaces can be derived from the stitched image frame/video feed and stored as results data set 423. The results can then be communicated to the client device 102, for example, as a number of available spaces, a percentage of available spaces, and/or the stitched image frame/video feed showing the parking area from which the user can derive their own conclusion.

Similar to the user case described above with reference to FIGS. 5A and 5B, the client device 102 can receive continuous updates related to parking availability at the target geographic region. For example, results data sets 423 can be updated with changes in parking measurements, which can be supplied to the client device 102 at determined periodic intervals, responsive to changes in the measurement, and/or responsive to a request from the client device 102 for an update.

Figure 7:
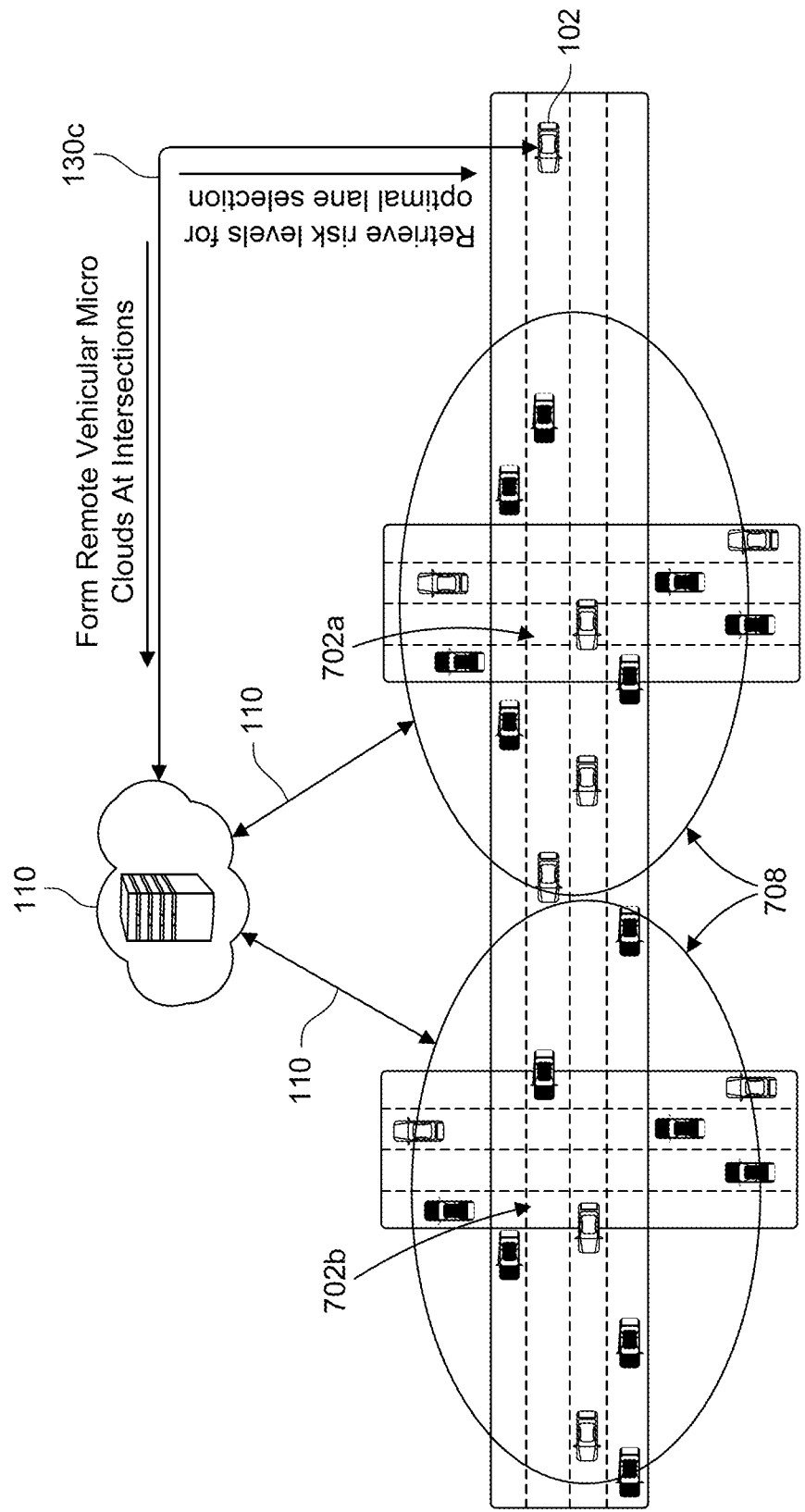
FIG. 7 is a schematic diagram of remote vehicular micro cloud formation for a risk assessment according to an embodiment described herein.

FIG. 7 is a schematic diagram of remote vehicular micro cloud formation for a risk assessment according to an embodiment described herein. FIG. 7 depicts an overview of the remote vehicular micro cloud formation utilized for a risk reasoning use case. The client device 102 (illustratively shown in FIG. 7 as an ego vehicle) requests a risk assessment of a road section ahead of the client device 102 and communicates with the server 110 to form remote vehicular micro clouds 708a and 708b at intersections 702a and 702b, respectively. As in earlier examples, the client device 102 is designated as the micro cloud leader. Connected vehicles (shown as block vehicles in FIG. 7) within a defined area of the target remote locations 702a and 702b become micro cloud members, and micro cloud members sense risk levels on the road via their sensor sets. Micro cloud leader leads the risk assessment remotely, and remote vehicular micro clouds 708a and 708b share observed risk levels with the client device 102 through the server 110. The client device 102 senses risk levels and guides its driver about an optimal lane to minimize collision risk. White vehicles in FIG. 7 may represent unconnected vehicles, for example, due to lacking capabilities for participate in the vehicular micro cloud or otherwise not participating in the vehicular micro cloud.

In operation, remote vehicular micro cloud formation starts with the request from the client device 102, including a target geographic region of interest (e.g., preceding roadway) and indication of the task (e.g., risk assessment). The client device 102 sends the remote vehicular micro cloud formation request to the server 110 and becomes the micro cloud leader. The micro cloud leader can define vehicular micro cloud formation parameters (e.g., range, type of resources, such as type of sensor data) and attach the rules to its request. The server 110 checks the request, selects the one or more locations 702a and 702b, forms the remote vehicular micro clouds 708a and 708b at the locations 702a and 702b according to formation rules and parameters, and communicates with connected vehicles in the remote locations. Connected vehicles in within the range of target locations 702a and 702b can become micro cloud members, and contribute their available resources to vehicular micro cloud to execute risk assessment. Micro cloud members in the remote vehicular micro clouds 708a and 708b can sense the roadway environment using one or more sensors (e.g., sensors 352, systems 358, and/or image sensors 360) and perform risk reasoning. For example, micro cloud members may compute lane-level Time-to-Collision (TTC) and Post Encroachment Time (PET). Micro cloud members can mark the lane in which they are traveling as risky when TTC and PET are below the safety threshold. Remote vehicular micro clouds 708a and 708b can then share risk levels with the micro cloud leader. The client device 102 as micro cloud leader can then guide its driver and suggest a lane change (or not) to minimize collision risk.

Accordingly, the client device in the examples of FIGS. 5A-7 does not need to initiate vehicular micro cloud formation locally. The client device 102 can form remote vehicular micro clouds at remote locations with the help of server 110.

Figure 8:
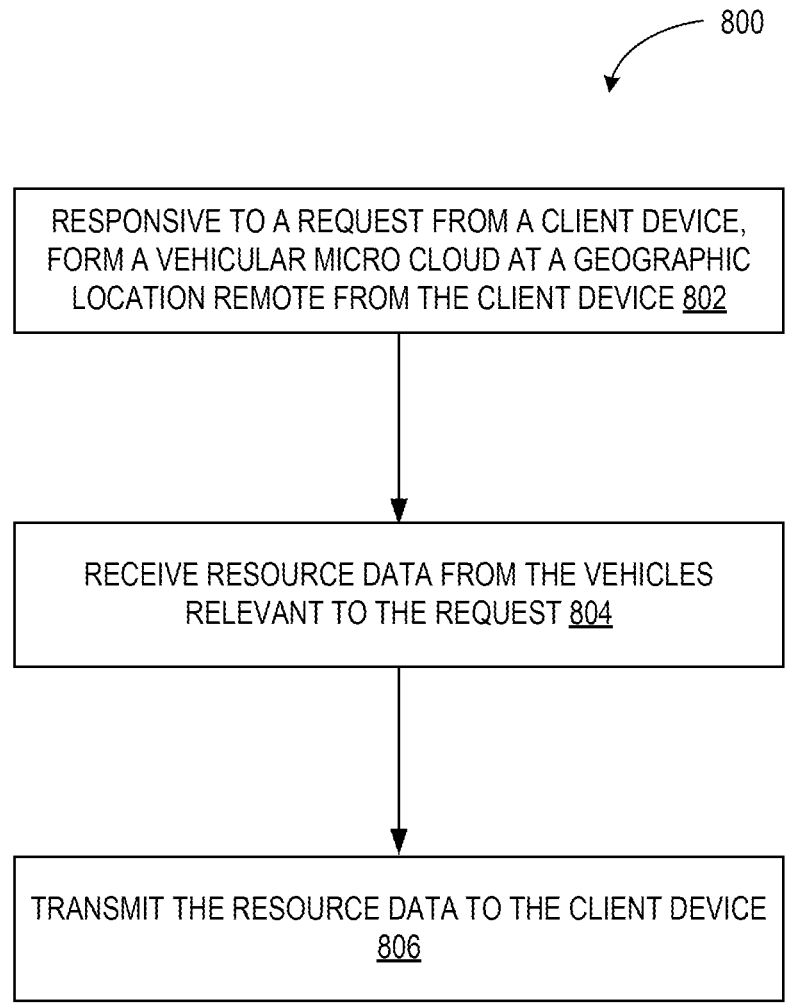
FIG. 8 is a flow chart illustrating example operations for remote vehicular micro cloud formation in accordance with various embodiments disclosed herein.

FIG. 8 is a flow chart illustrating example operations for remote vehicular micro cloud formation in accordance with various embodiments disclosed herein. FIG. 8 illustrates a process 800 that may be implemented as instructions, for example, stored on server 110, that when executed by one or more processors to perform the operations of process 800.

At block 802, a vehicular micro cloud is formed, responsive to a request from a client device to form the vehicular micro cloud, at a geographic location that is remote from the client device. For example, the client device may transmit a request to form the vehicular micro cloud to an edge or cloud server (or in a multi-hop manner). The request can include a target geographic region and information defining a task to be executed in the vehicular micro cloud. The server can unpackage the request, retrieve the target geographic region and identify candidate locations within the target geographic region. The server selects one or more locations and detects one or more connected vehicles and/or one or more RSU within a defined area surrounding each of the one or more locations. The server communicates with the detected vehicles and/or RSU to form the vehicular micro cloud so that the detected vehicles and/or RSU are micro cloud members. The client device is located at a location remote from the areas surrounding the geographic locations, and is generally remote from the geographic region included in the request.

The request can include information defining a task to be executed in the vehicular micro cloud. The server can unpackage the information defining the task and communicate one or more sub-tasks to the micro cloud members, each of which execute the sub-tasks using a sensor set (e.g., sensors 352, systems 358, and/or image sensors 360 of FIG. 3). The sub-tasks are tasks relevant to execution of the requested task, for example, a sub-task may be to capture image or video data surrounding each respective the cloud member for completing the requested task. The data collected by each cloud member is stored as resource data. In some cases, the remote vehicular micro cloud can be divided into smaller clouds (refer to as vehicular nano clouds, each designated for a sub-task. Additional details related to forming vehicular nano clouds are described in U.S. application Ser. No. 16/943,443, the disclosure of which is incorporated herein by reference. For example, according to number of requests and sub-tasks, embodiments disclosed herein may apply such methods to service multiple users at the same time without any interruption.

At block 804, resource data from each of the cloud members is received at the server. That is, the server collects resource data from cloud members of the vehicular micro cloud, which can be used to execute the requested task. At block 806, the resource data is transmitted to the client device. For example, resource data indicative of detection results pertaining to the request task is communicated to the client device. In some examples, resource data from cloud members is aggregated and processed to create a results data set, and the results data set is communicated to the client device.

Figure 9A:
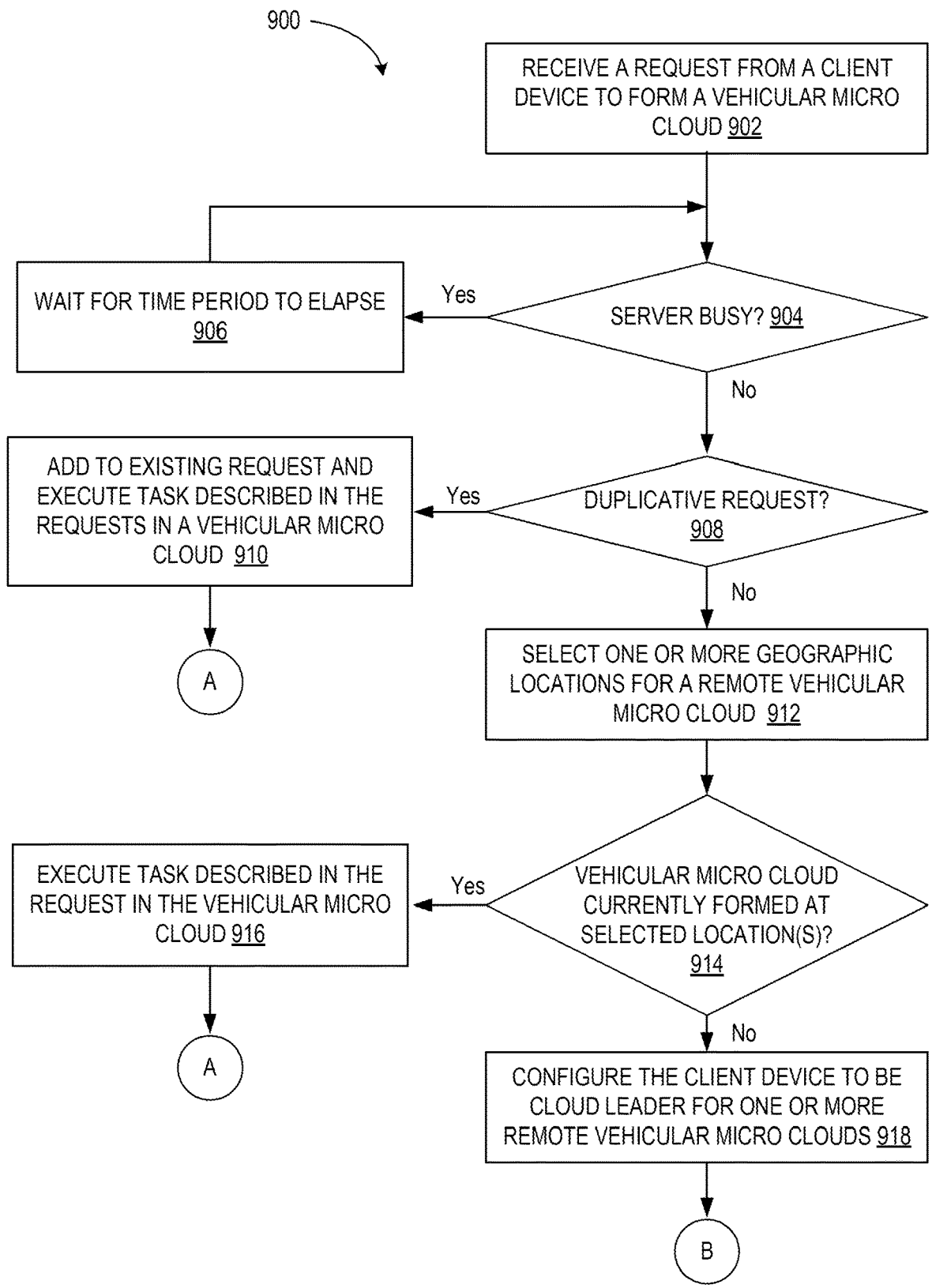
FIGS. 9A and 9B are a flow chart illustrating another example of operations for remote vehicular micro cloud formation in accordance with various embodiments disclosed herein.
Figure 9B:
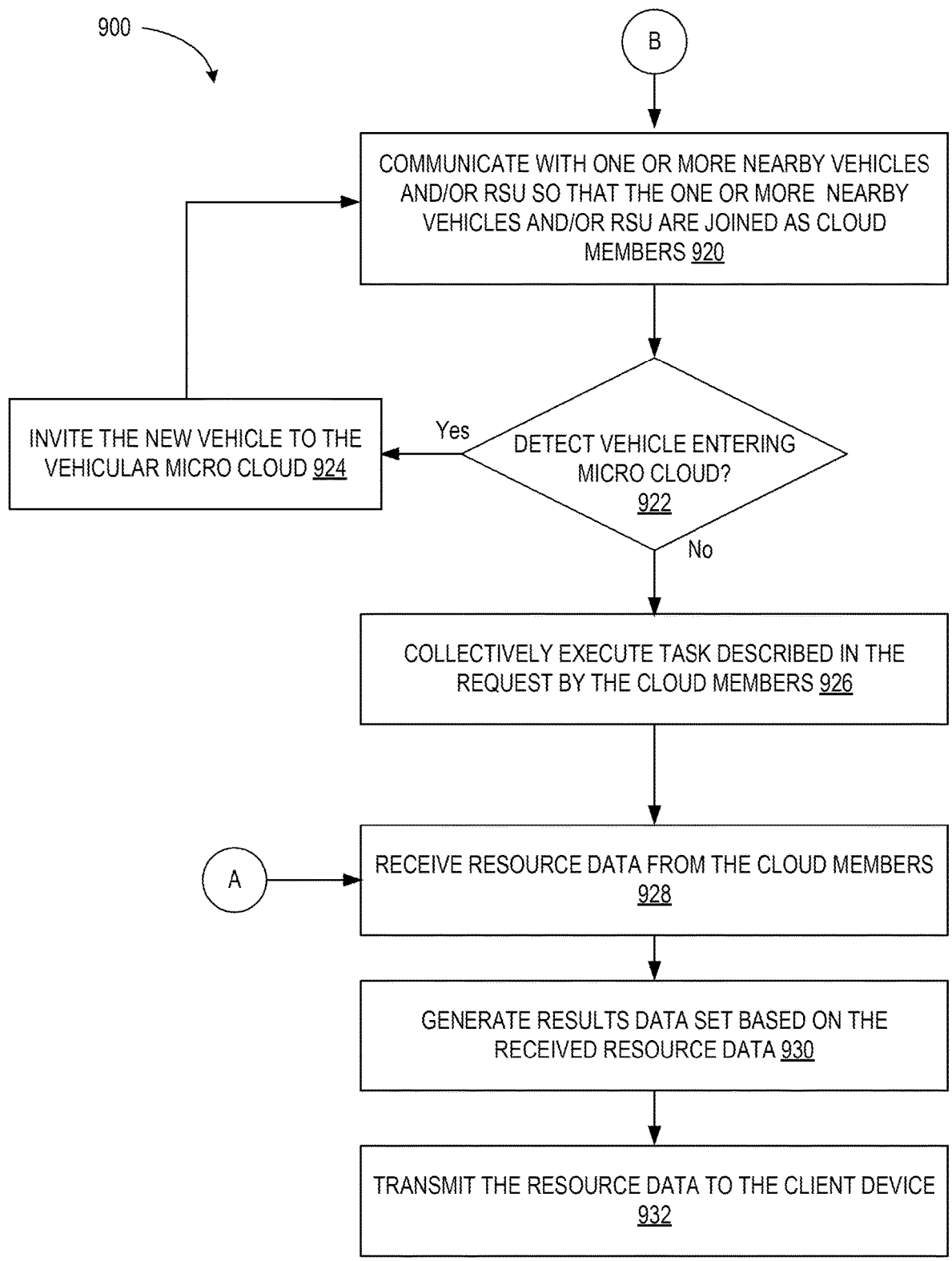

FIGS. 9A and 9B are a flow chart illustrating another example of operations for remote vehicular micro cloud formation in accordance with various embodiments disclosed herein. FIGS. 9A and 9B illustrate a process 900 that may be implemented as instructions, for example, stored on server 110, that when executed by one or more processors to perform the operations of process 900.

At block 902, a cloud or edge server receives a request to form a vehicular micro cloud from a client device. Alternatively, in some cases, the request may be received from the client device via a multi-hop manner. The request can include a target geographic region and information defining a task to be executed in the vehicular micro cloud. The client device can be remote from the target geographic region.

At block 904, process 900 determines if the cloud or edge server is busy. For example, the server may have received to many requests and is processing the pending requests, unable to address the request at block 902. If the determination at block 904 is YES, the process 900 proceeds to block 906, where it waits a set period of time before retrying the request. In some implementations, if the server is busy, the system may initiate to establish vehicular nano cloud, for example, as described in U.S. application Ser. No. 16/943,443, opposed of waiting for time period to elapse. In some cases, if the remote micro cloud is working at approximately 100% utilization rate, then process 900 may wait as described above. In an example implementation, the period of time may be 2 minutes, 5 minutes, 10 minutes, etc. If the determination at block 904 is NO, the process proceeds to determination block 908.

At determination block 908, process 900 determines if the request is duplicative of another, earlier request. For example, an earlier request may include the same target geographic region and same task (e.g., requesting measurement of parking availability for a given location, risk assessment at a given intersection, etc.). If the request is duplicative, it is added to the existing request and the task in the request is executed along with the existing request in an existing vehicular micro cloud, at block 910. Results for each request are, in this case, may be the same and can therefore be forwarded to the client device and the requestor of the existing request. Thus, multiple micro cloud leaders may be associated with a single vehicular micro cloud to reap the benefits of the collaborative execution of a task. If the determination at block 908 is NO, the process 900 proceeds to block 912.

At block 912, one or more geographic locations are selected for formation of one or more vehicular micro clouds. In some embodiments, the geographic locations are selected based on the task described in the request and on the target geographic region. For example, candidate locations within the target geographic region are identified, and one or more candidate locations are selected that can be used to execute the task. Selection of the one or more candidate locations may be so to cover an optimal amount of the target geographic region so to adequately generate relevant detection results pertaining to the task included in the request. That is, for example, a subset of all intersections included in a target geographic region may be selected that provide optimal coverage for providing relevant detection results.

At block 914, the process 900 determines if a vehicular micro cloud is currently formed at any of the one or more selected geographic locations. If a vehicular micro cloud does exist, the process 900 executes the task described in the request in the existing vehicular micro cloud at block 916. That is, capabilities and resources of the cloud members in the existing vehicular micro cloud are leveraged to collaborate on the task described in the request. Block 912 is performed for each of the one or more selected geographic locations.

If a vehicular micro cloud does not currently exist at a given geographic location, at block 918, the client device is configured as a micro cloud leader for a remote vehicular micro cloud to be formed at the one or more geographic locations. Additionally, at block 920, the process detects one or more connected vehicles and/or RSUs nearby the one or more geographic locations (e.g., within a defined area of each geographic location), communication between each detected connected vehicle and/or RSU and the cloud/edge server is established, and the detected connected vehicles and/or RSU are joined to the remote vehicular micro cloud as cloud members. In some embodiments, the client device may include parameters limiting the number of cloud members. For example, in the request at block 902, the client device may set a physical range from the geographic location defining the area (e.g., a radius); identify one or more make and/or models of vehicles that may be permitted as cloud members; threshold number of cloud members permitter; enabling stationary and/or mobile vehicular micro clouds, etc. Similarly, the client device may set sensor sets of the cloud members to be used for collaborating on the task. For example, the request may include identification of permitted sensors of cloud members, such as restricting the cloud members to front facing image sensors 364 only. While the example here is limited to only front facing image sensors, any combination of one or more of sensors 352, image sensor 360, and/or systems 358 may be identified the request. Additionally, the parameters and/or sensor sets may be maintained and/or set by the server, for example, in order to manage the amount of resource data received and processed, to ensure efficient use of the servers computation resources in processing received data.

At block 922, the process determines if a new vehicle is detected that has entered the defined area of the remote vehicular micro cloud. If a new vehicle is detected, at block 924, the detected vehicle is invited to join as a cloud member. If no new vehicles are detected (or in parallel with detecting new vehicles), the task described in the request is collectively executed by the cloud members at block 926. For example, the cloud/edge server may convert the requested task to sub-tasks that are executed by cloud members. Results of the sub-tasks are stored and communicated, from each respective cloud member, to the server as resource data.

The server receives the resource data at block 928 and aggregates the resource data to create results data set, at block 930. For example, resource data is aggregated and processed to determine a results of the task described in the request from the client device. In an illustrative example, image and/or video data is received from respective cloud members, the image and/or video data is stitched together, and stored as results data set. From the stitched image or video data, a detection result can be generated pertaining to the task described in the request and stored in the results data set. In another example, detection results can be determined at the cloud members and communicated to the server, which is aggregated and stored as results data set. The results data set is then transmitted to the client device at block 932.

Figure 10:
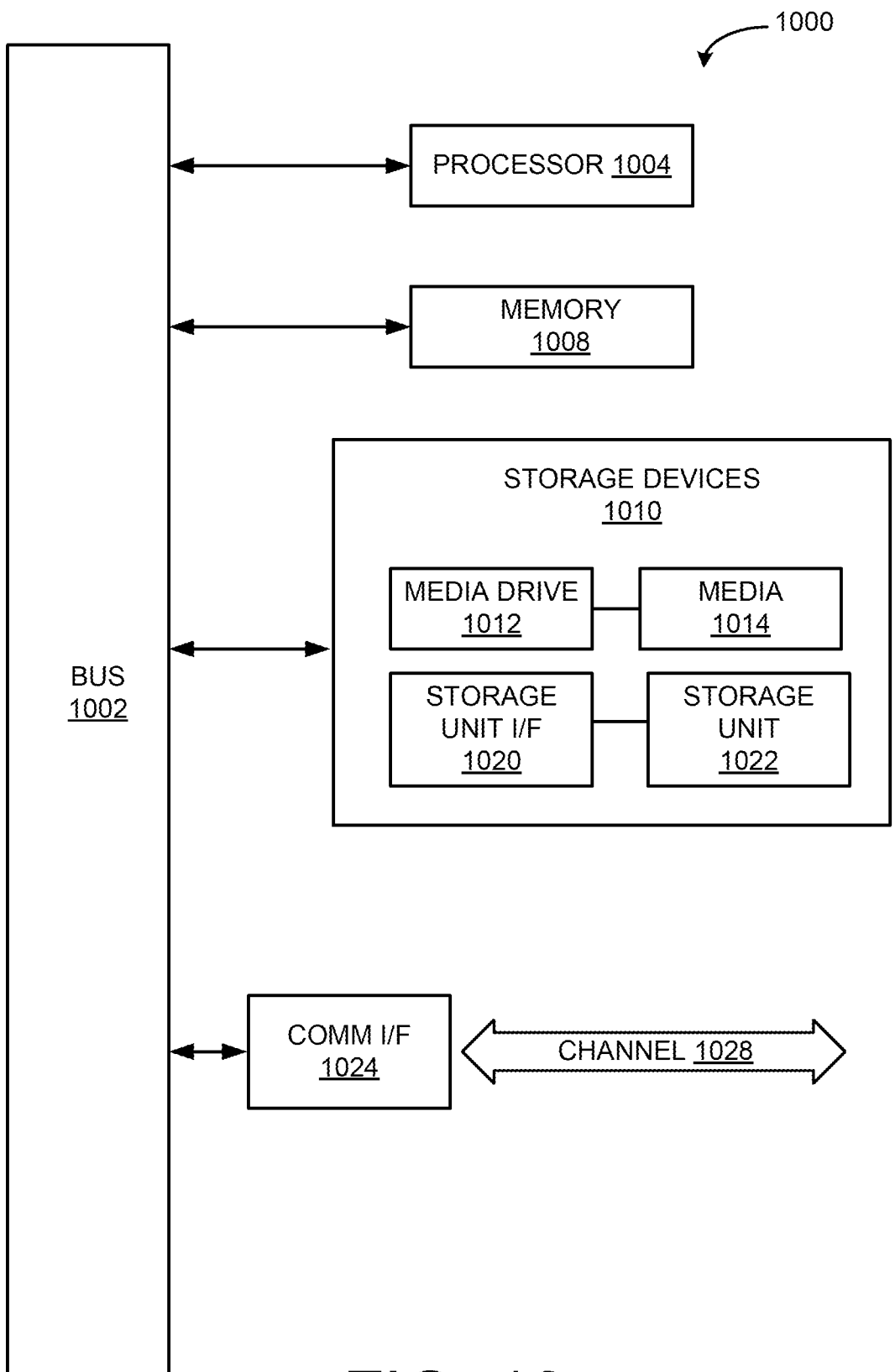
FIG. 10 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 10. Various embodiments are described in terms of this example-computing component 1000. After reading this description, it will become apparent to a person skilled in the relevant art how to implement the application using other computing components or architectures.

Referring now to FIG. 10, computing component 1000 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 1000 might also represent computing capabilities embedded within or otherwise available to a given device. For example, a computing component might be found in other electronic devices such as, for example, portable computing devices, and other electronic devices that might include some form of processing capability.

Computing component 1000 might include, for example, one or more processors, controllers, control components, or other processing devices. This can include a processor, and/or any one or more of the components making up user device 102 and/or cloud/edge service 110 of FIGS. 1 and 4. Processor 1004 might be implemented using a general-purpose or special-purpose processing engine such as, for example, a microprocessor, controller, or other control logic. Processor 1004 may be connected to a bus 1002. However, any communication medium can be used to facilitate interaction with other components of computing component 1000 or to communicate externally.

Computing component 1000 might also include one or more memory components, simply referred to herein as main memory 1008. For example, random access memory (RAM) or other dynamic memory, might be used for storing information and instructions to be executed by processor 1004. Main memory 1008 might also be used for storing temporary variables or other intermediate information during execution of instructions to be executed by processor 1004. Computing component 1000 might likewise include a read only memory ("ROM") or other static storage device coupled to bus 1002 for storing static information and instructions for processor 1004.

The computing component 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a solid-state drive, a magnetic tape drive, an optical drive, a compact disc (CD) or digital video disc (DVD) drive (R or RW), or other removable or fixed media drive might be provided. Storage media 1014 might include, for example, a hard disk, an integrated circuit assembly, magnetic tape, cartridge, optical disk, a CD or DVD. Storage media 1014 may be any other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing component 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory component) and memory slot. Other examples may include a PCMCIA slot and card, and other fixed or removable storage units 1022 and interfaces 1020 that allow software and data to be transferred from storage unit 1022 to computing component 1000.

Computing component 1000 might also include a communications interface 1024. Communications interface 1024 might be used to allow software and data to be transferred between computing component 1000 and external devices. Examples of communications interface 1024 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 1024 may be carried on signals, which can be electronic, electromagnetic (which includes optical) or other signals capable of being exchanged by a given communications interface 1024. These signals might be provided to communications interface 1024 via a channel 1028. Channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 1008, storage unit 1020, media 1014, and channel 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 1000 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for remote vehicular micro cloud formation, the method comprising:
   receiving a request to form a vehicular micro cloud from a client device, the request comprising an identification of a target geographic area and information defining a task to be executed by the vehicular micro cloud in the target geographic area, wherein the client device is remote from the target geographic;
   responsive to receiving the request to form the vehicular micro cloud from the client device, communicating with a plurality of vehicles within the target geographic area to collectively form a vehicular micro cloud at the target geographic area;
   receiving resource data from the plurality of vehicles, the resource data comprising detection results of an environment of the target geographic area based on sensor sets of the plurality of vehicles; and
   transmitting the resource data to the client device.

2. The method of claim 1, further comprising:
   selecting a geographic location within the target geographic area.

3. The method of claim 1, wherein the target geographic area is larger than the target geographic area.

4. The method of claim 1, wherein the target geographic area comprises at least one of: an urban area, an intersection of roadways, a landmark, a structure, a parking area, a roadway ahead of the client device.

5. The method of claim 1, further comprising:
   executing the task, included in the request to form a vehicular micro cloud, using the resource data received from the plurality of vehicles.

6. The method of claim 1, wherein the information of the task to be executed in the vehicular micro cloud comprises at least one of: attributes of a target object to be located, a make of a target vehicle to be located, a model of a target vehicle to be located, a license plate of a target vehicle to be located, a request for risk assessment of roadway ahead of the client device, a request measurements of parking availability.

7. The method of claim 1, further comprising:
   detecting one or more vehicles that enter the target geographic area; and
   communicating with the detected one or more vehicles so that the one or more vehicles are invited to join the vehicular micro cloud.

8. The method of claim 1, wherein the resource data from the plurality of vehicles comprises one or more image frames of the environment surrounding the target geographic area, wherein the method further comprises:
   stitching the image frames together into a panoramic image frame in accordance with respective positions of the plurality of vehicles.

9. The method of claim 1, wherein the vehicular micro cloud is a stationary vehicular micro cloud.

10. The method of claim 1, wherein the vehicular micro cloud is a mobile vehicular micro cloud that moves with a vehicle of the plurality of vehicles.

11. The method of claim 1, wherein communicating with a plurality of vehicles within the target geographic area to collectively form a vehicular micro cloud at the target geographic area comprises communicating with one or more roadside equipment.

12. The method of claim 1, wherein the client device is one of a smartphone, desktop computer, laptop computer, tablet computer, wearable smart device, and a vehicle.

13. A system for remote vehicular cloud formation, comprising:
   a communication circuit configured to exchange communications between the system and members of a vehicular micro cloud;
   a memory storing instructions; and
   one or more processors communicably coupled to the memory and configured to execute the instructions to:
      receive a request to form a vehicular micro cloud from a client device, the request comprising an identification of a target geographic area and information defining a task to be executed by the vehicular micro cloud in the target geographic area, wherein the client device is remote from the target geographic area;
      responsive to receiving the request to form the vehicular micro cloud from the client device, communicate with a plurality of vehicles within the target geographic area to collectively form a vehicular micro cloud at the target geographic area;
      receive resource data from the plurality of vehicles, the resource data comprising detection results of an environment of the target geographic area based on sensor sets of the plurality of vehicles; and
      transmit the resource data to the client device.

14. The system of claim 13, wherein the one or more processors are further configured to:
   select a geographic location within the target geographic area.

15. The system of claim 13, wherein the one or more processors are further configured to:
   execute the task, included in the request to form a vehicular micro cloud, using the resource data received from the plurality of vehicles.

16. The system of claim 13, wherein the one or more processors are further configured to:
   detect one or more vehicles that enter the target geographic area; and
   communicate with the detected one or more vehicles so that the one or more vehicles are invited to join the vehicular micro cloud.

17. The system of claim 13, wherein the vehicular micro cloud is one of a stationary vehicular micro cloud and a mobile vehicular micro cloud that moves with a vehicle of the plurality of vehicles.

18. A non-transitory machine-readable medium having instructions stored therein, which when executed by a processor, cause the processor to perform operations, the operations comprising:
  receiving a request to form a remote vehicular micro cloud from a client device, the request comprising an identification of a target geographic region that is geographically remote from the client device and information defining a task to be executed by the remote vehicular micro cloud;
  in response to receiving the request, selecting one or more geographic locations within the target geographic region;
  establishing one or more remote vehicular micro clouds at the one or more geographic locations by communicating with at least one of one or more roadside equipment and one or more vehicles within a defined area from each of the one or more geographic locations;
  generating a detection result related to the task included in the request based on resource data received from the at least one of one or more roadside equipment and one or more vehicles; and
  transmit the detection results to the client device.

* * * * *